(12) United States Patent
Baitinger et al.

(10) Patent No.: US 12,722,832 B2
(45) Date of Patent: Sep. 1, 2026

(54) METHODS AND SYSTEMS FOR USE IN PROCESSING SEEDS

(71) Applicant: MONSANTO TECHNOLOGY LLC, Saint Louis, MO (US)

(72) Inventors: David Baitinger, Ogden, IA (US); Jennifer Becker, Muscatine, IA (US); Thomas Emborg, Wentzville, MO (US); Scott Grasman, Flushing, MI (US); Chung-Hsuan Huang, Eagan, MI (US); Shrikant Jarugumilli, O'Fallon, MO (US); Anirudha Kulkarni, O'Fallon, MO (US); Krishna Nandanoor, Lexington, KY (US); Barrett Thomas, Iowa City, IA (US); Eric Thompson, Urbandale, IA (US)

(73) Assignee: MONSANTO TECHNOLOGY LLC, Saint Louis, MO (US)

( * ) Notice: Subject to any disclaimer, the term of this patent is extended or adjusted under 35 U.S.C. 154(b) by 397 days.

(21) Appl. No.: 18/224,534

(22) Filed: Jul. 20, 2023

(65) Prior Publication Data

US 2024/0034503 A1 Feb. 1, 2024

Related U.S. Application Data

(60) Provisional application No. 63/393,778, filed on Jul. 29, 2022.

(51) Int. Cl.

*B65B 57/20* (2006.01)
*A01C 7/00* (2006.01)

(Continued)

(52) U.S. Cl.

CPC ................ *B65B 57/20* (2013.01); *A01C 7/00* (2013.01); *B65B 5/06* (2013.01); *B65B 25/02* (2013.01);

(Continued)

(58) Field of Classification Search

CPC ........... B65B 57/20; B65B 5/06; B65B 25/02; A01C 7/00; A01C 15/003; A01C 21/005; G06Q 10/063; G06Q 10/08; G06Q 50/02

See application file for complete search history.

(56) References Cited

U.S. PATENT DOCUMENTS 4,858,775 A * 8/1989 Crouch .................... B66B 9/00 212/312
7,775,167 B2 8/2010 Stehling et al.

(Continued)

*Primary Examiner* — Sohana Tanju Khayer

(74) *Attorney, Agent, or Firm* — Harness, Dickey & Pierce, P.L.C.

(57) ABSTRACT

Systems and methods for filling cassettes consistent with sets of seeds are provided. One example computer-implemented method includes, in response to a request for a schedule to fill a plurality of the cassettes, accessing data associated with the cassettes including a seed set specific to each of the cassettes and generating a schedule to fill the plurality of cassettes with seeds, consistent with the seed sets specific to the plurality of cassettes, via a gantry, multiple counting stations, and a filling station, based on a throughput of the gantry, the multiple counting stations, and the filling station. The method then includes executing the schedule at the gantry, the multiple counting stations, and the filling station to fill at least a portion of the plurality of cassettes with the appropriate sets of seeds consistent with the schedule.

20 Claims, 11 Drawing Sheets

(51) Int. Cl.

| | |
|---|---|
| ***A01C 15/00*** | (2006.01) |
| ***A01C 21/00*** | (2006.01) |
| ***B65B 5/06*** | (2006.01) |
| ***B65B 25/02*** | (2006.01) |
| ***G06Q 10/063*** | (2023.01) |
| ***G06Q 10/08*** | (2024.01) |
| *G06Q 50/02* | (2024.01) |

(52) U.S. Cl.
CPC ........... *G06Q 10/063* (2013.01); *G06Q 10/08* (2013.01); *A01C 15/003* (2013.01); *A01C 21/005* (2013.01); *G06Q 50/02* (2013.01)

(56) References Cited

U.S. PATENT DOCUMENTS 9,598,191 B2 3/2017 Deppermann et al.
9,988,216 B1 * 6/2018 McCalib, Jr. ........ B65G 47/843
2006/0056951 A1 * 3/2006 Williamson .............. B66F 9/07 414/626
2006/0251498 A1 * 11/2006 Buzzoni .................. B66C 13/48 414/139.9
2011/0047042 A1 * 2/2011 Blickhan ................ G06Q 10/06 705/26.25
2014/0165506 A1 * 6/2014 Deppermann .......... B65B 5/101 53/471
2015/0177110 A1 * 6/2015 Cargill .................... B65B 25/02 414/331.02
2018/0065763 A1 * 3/2018 Nienberg ............ E02D 29/0291
2018/0317375 A1 * 11/2018 Weis ......................... B07C 5/08
2021/0153438 A1 5/2021 Baitinger et al.
2022/0101380 A1 3/2022 Suzuki et al.
2022/0217896 A1 7/2022 Dayawon et al.
2023/0107923 A1 * 4/2023 Gartner ................... E21F 13/00 187/247

* cited by examiner 280
218
280
280

METHODS AND SYSTEMS FOR USE IN PROCESSING SEEDS

CROSS-REFERENCE TO RELATED APPLICATION

This application claims the benefit of, and priority to, U.S. Provisional Application No. 63/393,778, filed Jul. 29, 2022. The entire disclosure of the above application is incorporated herein by reference.

FIELD

The present disclosure generally relates to methods and systems for use in processing seeds. More particularly, the present disclosure relates to methods and systems for use in filling seeds into cassettes (e.g., seed fulfillment, etc.) and, in doing so, to defining schedules for filling the cassettes, consistent with available resources and defined seed sets, and filling multiple cassettes consistent with the schedules.

BACKGROUND

This section provides background information related to the present disclosure which is not necessarily prior art.

In agricultural research, selected varieties of seeds (e.g., different lines or hybrids, etc.) are planted in experimental plots under selected parameters, including soil type, climatic zones, different management practices such as tillage or fertilizer rates, etc. After planting the seeds, depending on types of crops associated with the seeds, the crops progress through various growth stages until harvest. At the time of harvest, or prior, a grower may take measurements of different characteristics of the crops, such as, for example, height, moisture content, etc., where the characteristics may be correlated to the performance of the crops.

In addition, the seeds to be planted in the plots (as part of the agricultural research) may come from and/or may be provided by a centralized seed fulfillment facility. In connection therewith, numerous varieties of harvested seeds may come into the fulfillment facility from many geographical locations at different times. The seeds may then be processed and packaged, and then directed from the facility to different regions for planting, as part of the agricultural research.

SUMMARY

This section provides a general summary of the disclosure and is not a comprehensive disclosure of its full scope or all of its features.

Example embodiments of the present disclosure generally relate to methods for conveying different seeds into cassettes, consistent with available resources and prescribed distributions. In one example embodiment, such a method generally includes in response to a request for a schedule, accessing, by a scheduler computing device, data associated with a plurality of cassettes, the data including a seed set specific to each of the cassettes, at least a portion of the seed set including multiple different seeds; generating, by the scheduler computing device, a schedule to fill the plurality of cassettes with seeds, consistent with the seed sets specific to the plurality of cassettes, via a gantry, multiple counting stations, and a filling station, based on a throughput of the gantry, the multiple counting stations, and the filling station; storing, by the scheduler computing device, the schedule in memory; and executing, by the scheduler computing device, the schedule, at the gantry, the multiple counting stations, and the filling station to fill at least a portion of the plurality of cassettes consistent with the schedule.

Example embodiments of the present disclosure generally relate to systems for conveying different seeds into cassettes, consistent with available resources and prescribed distributions. In one example embodiment, such a system generally includes a gantry configured to retrieve specific seeds for processing from a seed supply; at least one counting station configured to receive the seeds from the gantry and deliver a desired number of the seeds into one or more containers; a filling station configured to transfer the seeds from the one or more containers to one or more cassettes; and a scheduler computing device configured to generate a schedule to fill the one or more cassettes with the seeds based, at least in part, on (i) a throughput of the gantry, the at least one counting station, and the filling station and on (ii) the seed supply.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments, are not all possible implementations, and are not intended to limit the scope of the present disclosure.

FIG. 8 is a perspective view of an example tube that may be used in the system of FIG. 1 and/or the seed processing facility of FIG. 2;

Figure 1:
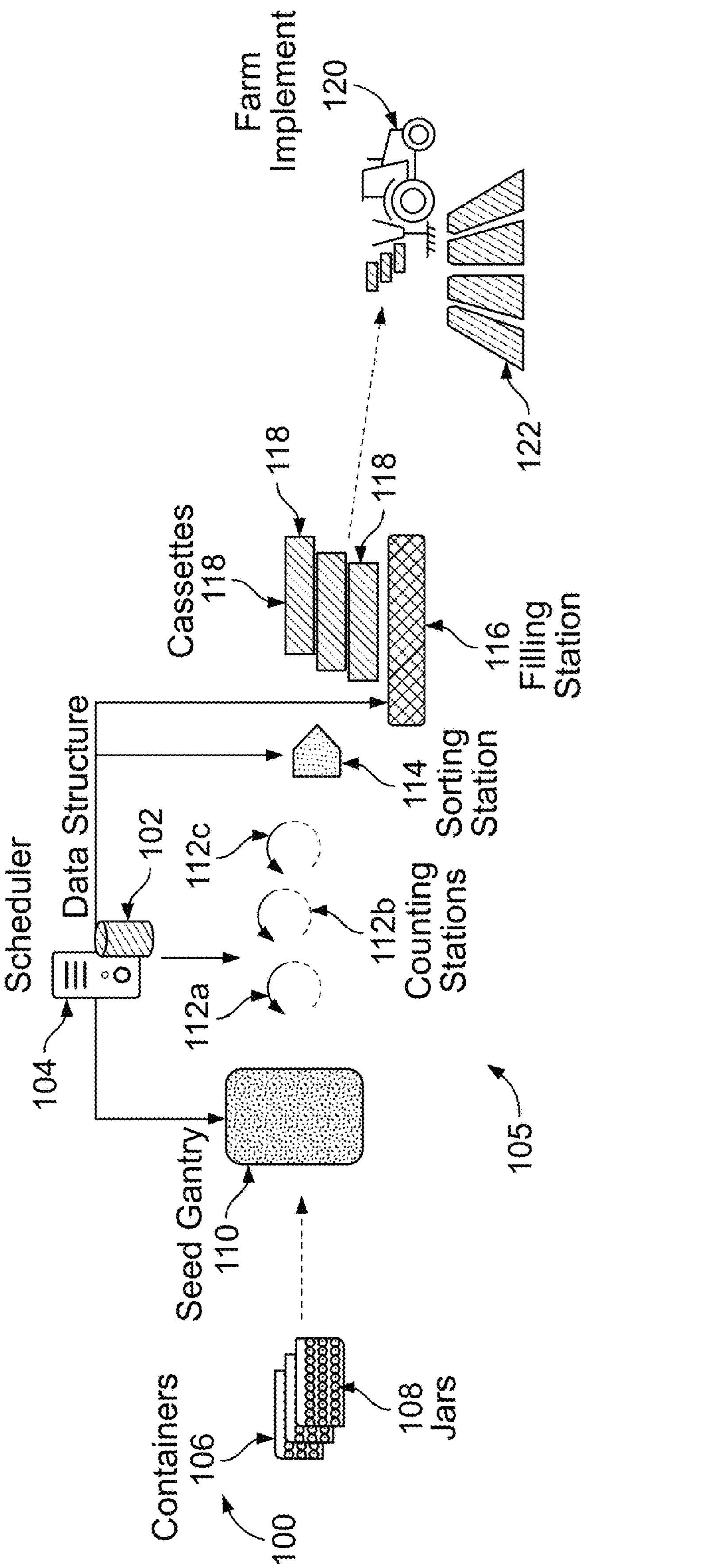
FIG. 1 illustrates an example system of the present disclosure configured for defining schedules for filling seeds into cassettes, consistent with available resources and defined sets.
Figure 10:
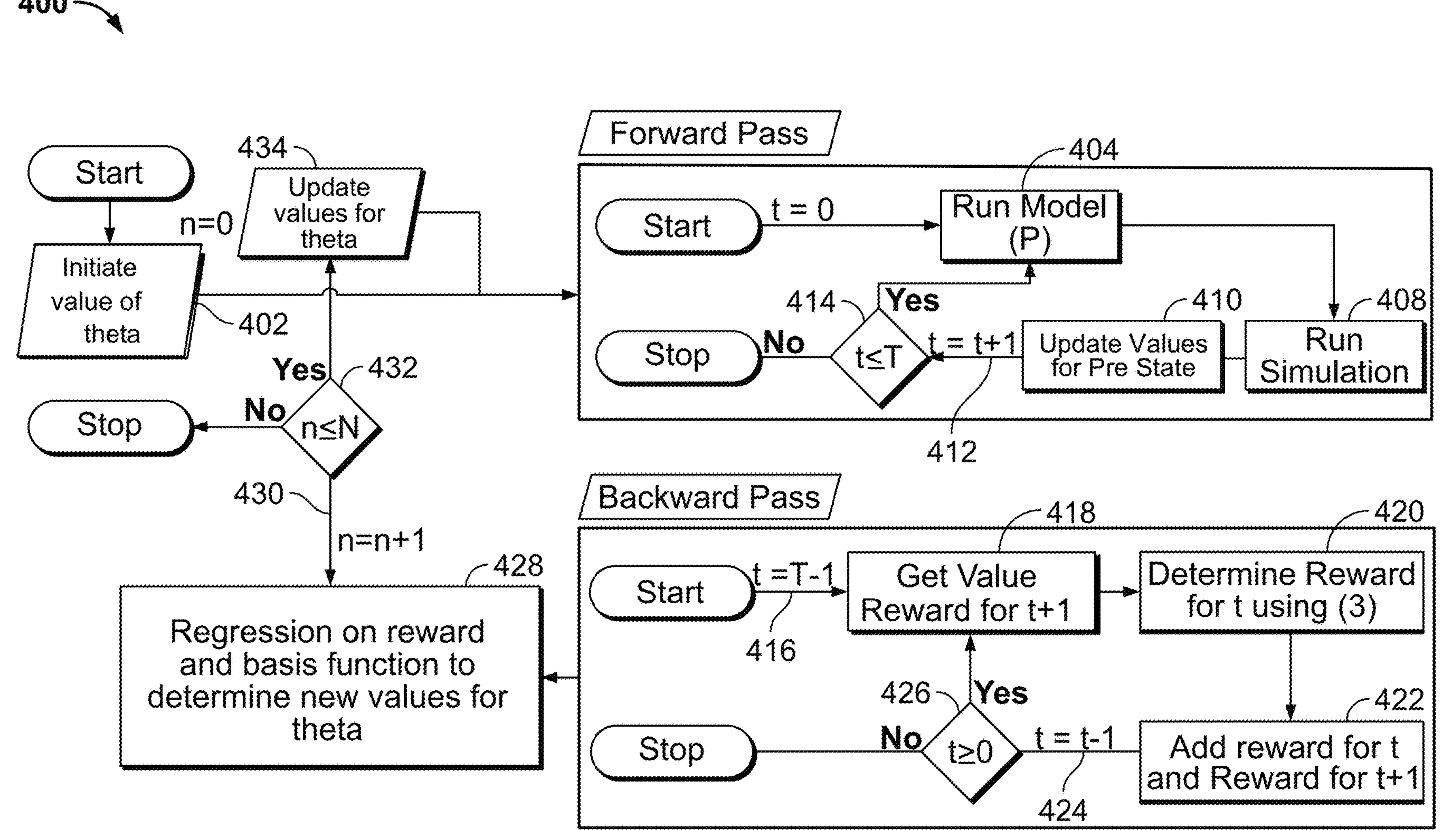
Figure 11:
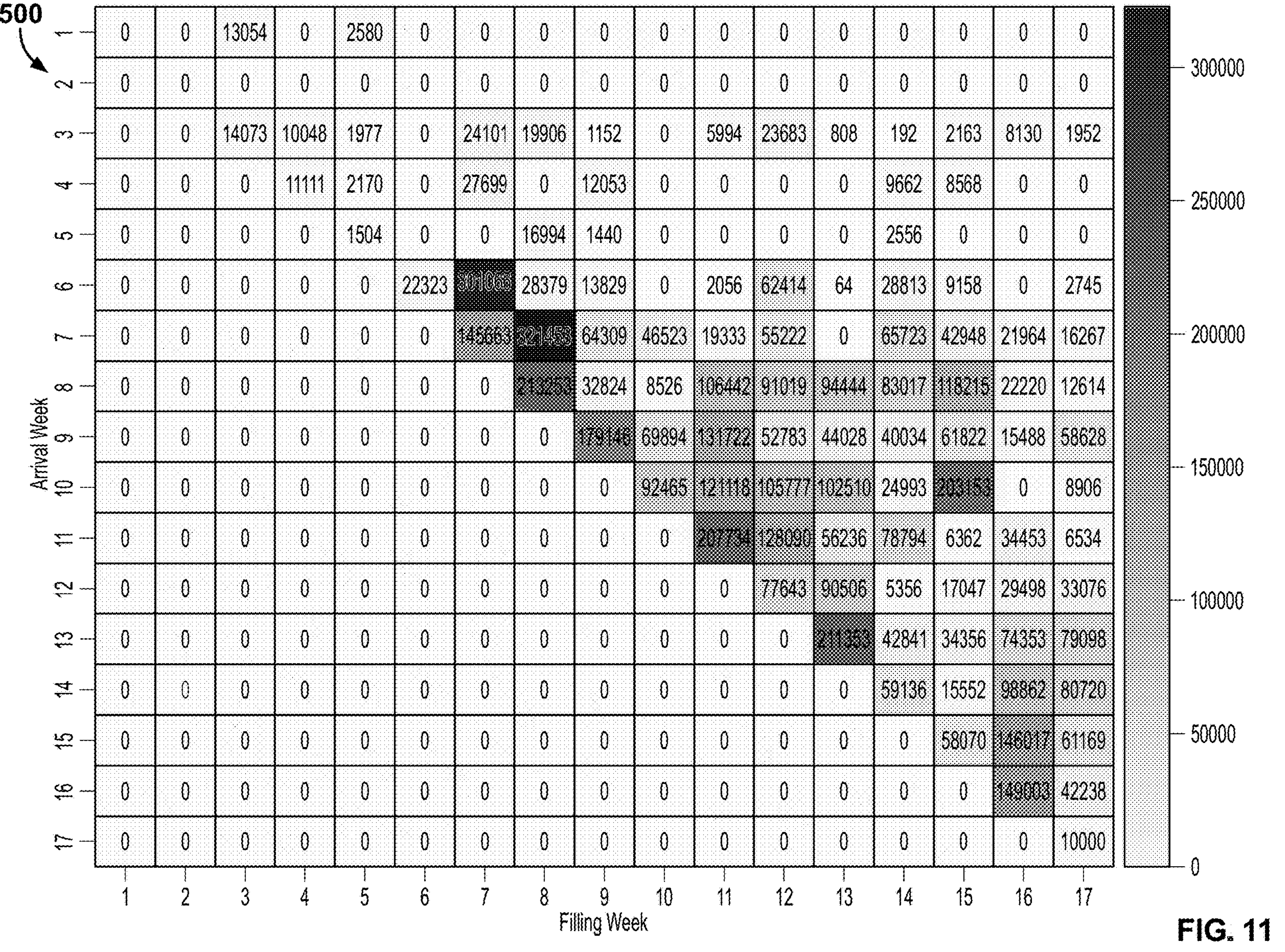

FIG. 10 illustrates a flow diagram of an example method, which may be used in (or implemented in) the system of FIG. 1, for use in defining a schedule, consistent with available resources and defined sets; and FIG. 11 illustrates an example seed fulfillment (or filling) plan (or schedule) for cassettes that may be generated in the system of FIG. 1 and/or the method of FIG. 10, where the plan is defined by multiple example sets of seeds to be planted.

Corresponding reference numerals indicate corresponding parts throughout the several views of the drawings.

DETAILED DESCRIPTION

Example embodiments will now be described more fully with reference to the accompanying drawings. The description and specific examples included herein are intended for purposes of illustration only and are not intended to limit the scope of the present disclosure.

In plant development programs, different plants, by way of seeds, are subjected to different testing at various stages of growth and/or processing associated with plant development (e.g., breeding processes, etc.) within the programs. The testing may involve planting the seeds, and then recording results associated with plants grown from the seeds, including, for example, yield, height, stalk strength, etc. In connection therewith, cassettes of the seeds may be filled and provided to growers, whereby the cassettes include specific seeds in a particular order to be planted in a particular location in a particular field (e.g., as part of a given program, etc.). When the inventories of seeds used to fill the cassettes vary in availability, and are substantial in number, the process of filling the cassettes, for example, from a larger number of jars of seeds (e.g., with different jars included in numerous different boxes, totes, bins, etc.), may be cumbersome and inefficient. Availability of filling systems associated with the jars, as well as counting systems associated with the seeds, may further impact the ability to fill the cassettes in a timely and efficient manner, relative to receipt of seed inventories and deadlines to deliver the cassettes to the fields. In one example embodiment, the scheduling of filling of the cassettes may account for several thousand containers (e.g., boxes, totes, bins, etc.) giving rise to hundreds of thousands of jars within the containers and thus millions of seeds, and may be required then to fill millions of cells within the cassettes with the seeds in a particular order, based on availability of inventory of the seeds and deadlines by which the cassettes must be filled.

Uniquely, the systems and methods herein provide for conveying different seeds into cassettes, consistent with available resources and prescribed distributions (e.g., as part of scheduling, etc.). In particular, a scheduler provided herein relies on inputs such as inventories (e.g., seeds in jars, jars in containers, etc.), numbers of cassettes and/or sets of seeds to be filled into the cassettes, deadlines for filling the cassettes, etc., to generate a schedule for filling the cassettes consistent with the inventories and deadlines. The generating of the schedule, then, accounts for the different sets of seeds to be filled into the different cassettes, the availability of inventory in different containers, and the deadlines, whereby a schedule may be created consistent with a desired objective, despite the substantial number of different permutations by which the cassettes could be scheduled/filled.

FIG. 1 illustrates an example system 100 in which one or more aspects of the present disclosure may be implemented. Although the system 100 is presented in one arrangement, other embodiments may include the parts of the system 100 (or additional parts) arranged otherwise depending on, for example, number, sources and/or types of seeds available; or types, sizes, and/or numbers of cassettes; availability of inventories; types of devices at seed sorting facilities; etc.

The system 100 generally includes a data structure 102 in communication with a scheduler 104 (or scheduler computing device), and a seed processing facility 105 comprising a seed gantry 110, counting stations 112*a-c*, sorting station 114, and filling station 116. The seed processing facility 105, then, is configured to process seeds as described herein based on instructions from the scheduler 104.

Figure 6:
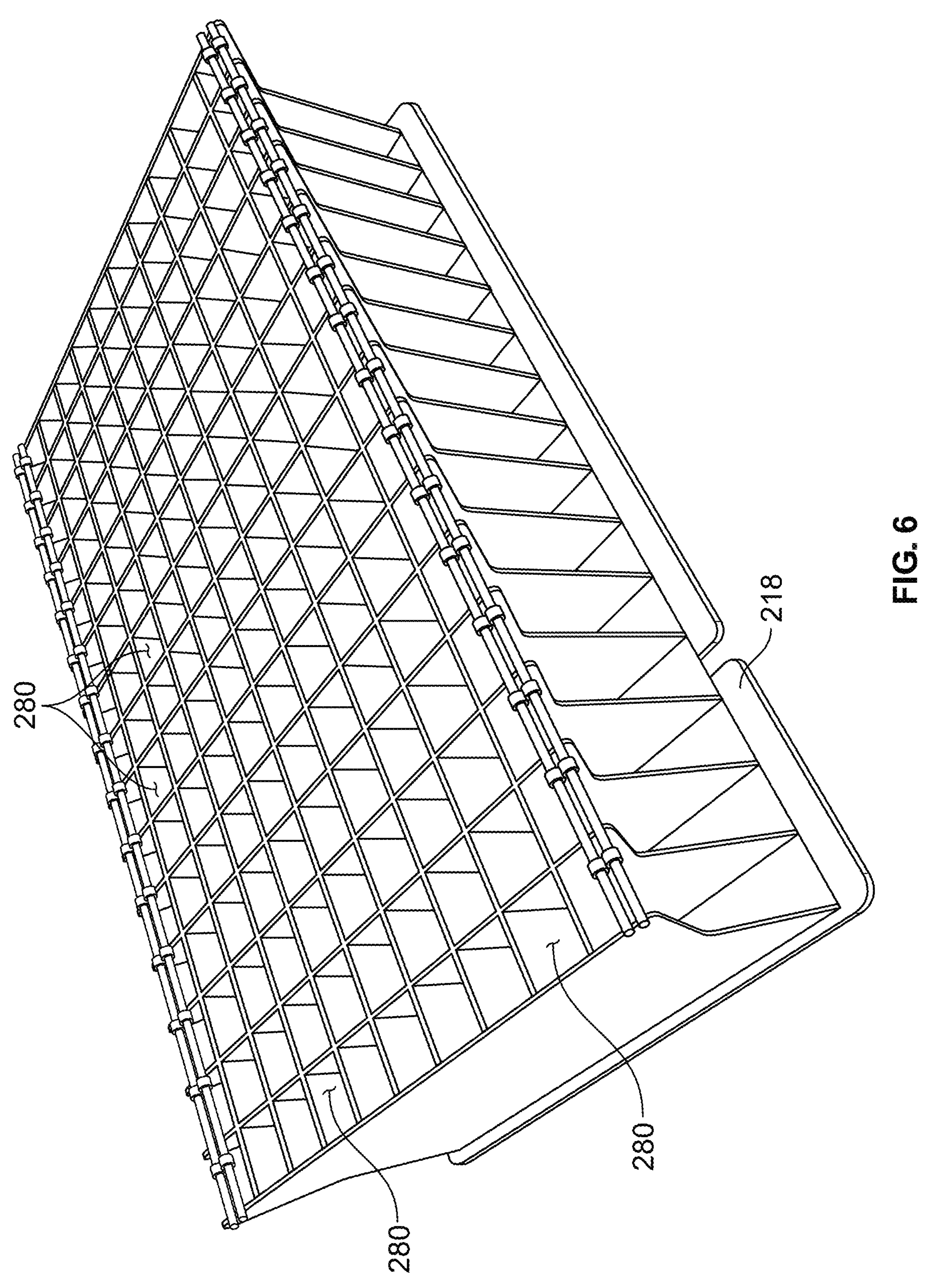
FIG. 6 is a perspective view of an example cassette that may be used in the system of FIG. 1 and/or the seed processing facility of FIG. 2.

For instance, in the example system 100, the seed processing facility 105 is configured to retrieve desired seeds from containers 106 (broadly, seed sources) and fill cassettes 118 (see, also, FIG. 6 illustrating example cassette 218, which may be used in the system 100) with sets of the desired seeds (as instructed by the scheduler 104), whereby one or more of the cassettes 118 are deployed to be used to plant field 122 consistent with the set(s) therein, etc. The sets of seeds to be included in the cassettes may be predefined by growers or others, for example, as part of a growing program or plant development program, and the cassettes may then be deployed with the particular seeds included therein (as a set or as sets of seeds) for planting. As such, each of the various cassettes is generally filled with a specific set of seeds, as defined by the growing program, grower, development program, etc. The planting, then, may be achieved by way of a planter 120 (or planters) (broadly, a farm implement) configured to utilize the one or more delivered cassettes 118, etc. to plant the set(s) of seeds therein in the field 120 (see, e.g., Applicant's U.S. Pat. No. 7,775,167, etc.).

In general, the system 100 is tasked with the compilation of the cassettes 118 for use in planting various fields (including the field 122), and in particular in this example embodiment, for use in planting seeds in connection with various trials to be included in the fields. The trials generally include different seeds, for example, two or more varieties of seeds, a mixture of seeds, etc., which are to be planted proximate to one another, whereby the seeds (often referred to as a set (or sets) of seeds herein) generally aims to limit the impact of external factors based on locations of seeds (e.g., like seeds, seeds for comparison, etc.), etc. In some embodiments, for example, the sets of seeds in the cassettes 118 may include up to 60 different seeds (in one cassette or multiple cassettes). In other embodiments, the sets of seeds may include up to 100 different seeds, or more or less, for example, depending on a particular experiment, trial, prescription, etc. In general, the particular seeds to be included in the sets, as well as a type and/or capacity of the farm implement 120 to be used to plant the seeds, may define which seed sources (e.g., which of the containers 106, etc.) are involved in filling the cassettes 118 and also complexity of filling the cassettes 118. What's more, each set of seeds may be defined by not only the types of seeds to be included, but also counts for each type of seed, numbers of rows/columns to be planted, locations of the sets in specific fields, etc.

The example system 100 is also associated with a planning phase and a delivery phase. In the planning phase, trials, and maps associated with locations of the trials in fields (e.g., in field 122, etc.) (and the particular types of seeds to be planted), are submitted to the system 100 (and, in particular, to the scheduler 104), so that, in turn, one or more of the cassettes 118 may be filled by the system 100 to be available for planting sets of seeds in the cassettes 118 in the trials at/by specified times. In connection therewith, as trials (and maps) are received, they are stored in data structure 102. In addition, seed requirements associated with the trials are identified, for example, by scheduler 104, and data indicative of the required sets are similarly stored in the data structure 102 (e.g., in associated with the received trial and map data, etc.). In the delivery phase, then, the cassettes 118 (and sets of seeds therein) are actually sent out to locations associated with the trials, for example, field 122. However, the planning phase and the delivery phase often overlap, such that all trials and/or maps associated therewith may not be available (or may not be complete) at a time of (or for) initial scheduling and/or filling of cassettes to satisfy the associated sets. As such, the scheduler 104 must also account for potential deviations in flow of seeds through the seed processing facility 105 as a result of such overlap.

It should be appreciated that as further trials are defined and/or maps are received by the system 100 (and scheduler 104), through the planning phase and/or delivery phase, the same are stored in the data structure 102, and then also made accessible to the scheduler 104 for purposes of scheduling the filling of associated cassettes 118, modifying existing schedules for filling the cassettes 118, etc.

In addition, data indicative of the specific fields (e.g., field 122, etc.) and farm implements associated with the fields (e.g., farm implement 120, etc.) may be included in the data structure 102. The farm implements may include, without limitation, a planter, for example, as described in more detail below, which is suitable to plant a certain number of rows at one time, or is capable (or compatible) with a certain type, size, etc., of cassette. That said, it should be appreciated that in some embodiments the sets of seeds may be defined in one or more manners to eliminate need for certain data related to the farm implements and/or the fields into which the seed are to be planted (e.g., the sets may be defined so as to be independent of the planter used to plant the sets of seeds and/or independent of the field into which the seeds are to be planted, etc.).

Beyond the sets of seeds to be included in the cassettes 118 and the corresponding trial/planting maps provided to the system 100 to achieve the desired planting, etc., the data structure 102 further includes data indicative of the cassettes 118, fields the cassettes 118 need to go to, inventories in the cassettes 118 relative position of inventories in the field, inventory of seeds (and/or sources of seeds) included at the seed processing facility 105, and/or otherwise available to the system 100 for filing the cassettes 118. In connection therewith, the sources of seeds may include seeds from plants harvested from fields, seeds from one or more storage facilities, etc. Because the planning phase may run coextensive with at least a portion of harvesting of plants, the seed sources included in and/or available to the system 100 may change as the planning phase proceeds, whereby sources of seeds to be included in one or more sets (and cassettes 118) may be available or may be unavailable to fill the associated requests at certain times. Or, the seed sources may need to be shifted, for example, from harvested plants to storage facilities, etc.

Notwithstanding the above, it should be appreciated that still other data related to the seeds, seed availability, position/location of the seeds (e.g., in containers 106 at the seed processing facility 105, at other storage locations, etc.), may be included in the data structure 102 and accessible to the scheduler 104, as necessary or desired.

Figure 7:
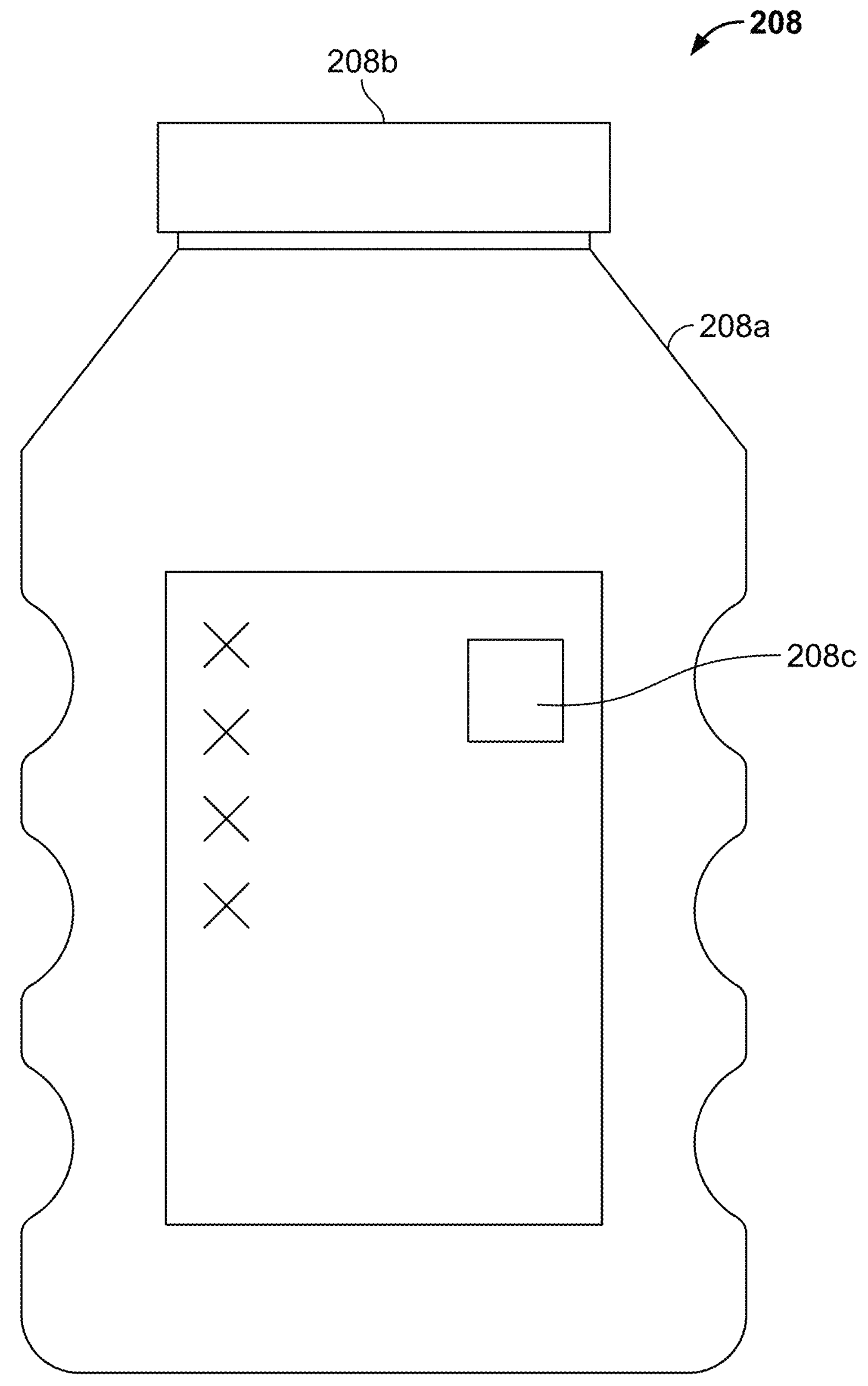
FIG. 7 is an elevation view of an example jar that may be used in the system of FIG. 1 and/or the seed processing facility of FIG. 2.

As shown in FIG. 1, in this example embodiment, the seed sources include multiple containers 106 (e.g., totes, boxes, bins, etc.) located, for example, at the seed processing facility 105, or potentially located otherwise, for example, at a storage facility, etc. (broadly, at a supply of the seeds or supply location(s) of the seeds (or seed supply)). Each of the containers 106, then, includes multiple jars 108 (broadly, seed holders, etc.) filled with seeds (see, also, FIG. 7 illustrating example jar 208, which may be used in the system 100). In the illustrated embodiment, each of the containers 106 is sized, configured, etc. to hold about thirty jars 108. However, in other embodiments, the containers 106 may be sized, configured, etc. to hold other numbers of jars 108 (e.g., more than about thirty jars, less than about thirty jars, etc.), or to hold other types of seed holders, etc. For example, one or more of the containers 106 may be configured to hold at least about ten jars 108, at least about fifteen jars 108, at least about 45 jars 108, at least about 60 jars 108, more than about 60 jars 108, etc. In addition, the jars 108 may include sufficient quantities of seeds to fill a desired number of tubes in the system 100 (as part of, or associated with, counting stations 112*a-c* of the seed processing facility 105) including, for example, at least about 10 tubes, at least about 20 tubes, at least about 40 tubes, at least about 50 tubes, at least about 60 tubes, or more or less tubes, as explained more below. Further, while three containers are illustrated in FIG. 1, it should be appreciated that the system 100 (e.g., the seed processing facility 105 thereof, etc.) will typically include a number of containers to accommodate, without limitation, at least about 5,000 jars, at least about 10,000 jars, at least about 100,000 jars, at least about 250,000, at least about 500,000 jars, more than 500,000 jars, etc., depending on, for example, a volume of seeds to be filled and/or a number of different seeds to be filled, etc.

Each of the jars 108 in the system 100 includes a different type of seed, or a different variety of seed. In addition, it should be appreciated that some of the jars 108 may include the same seeds filled at one (or the same) time, or the jars 108 may be populated (or filled) with seeds over time (e.g., partially filled at an initial time, positioned in a container 106, then removed from the container 106 at a later time and further filled, etc.). In connection therewith, each jar 108 and/or container 106 may include one or more machine readable labels, for example, a machine readable label such as a bar code (e.g., a matrix bar code, such as a QR code; etc.), a RFID tag, etc., that includes information relating to the seeds contained in the jar 108 and/or container 106. Data indicative of the containers 106, and the jars 108 included in the containers 106, is included in the data structure 102 (e.g., types of seeds, from where the seeds were received, dates/times the seeds were received in the jars 108 and/or containers 106, etc.), along with a count of seeds included therein. FIG. 7, again, illustrates the example jar 208, which may be used in the system 100. As such, the example jar 208 includes a body 208*a* containing a quantity of seeds, a lid 208*b*, and a label 208*c* (e.g., a machine readable label, such as a bar code (e.g., matrix bar code, such as QR code), a RFID tag, etc.) attached to the body 208*a*. The label 208*c* may identify a type of seed in the jar 208 and may also be associated with additional information (e.g., number of seeds in the jar, a location of origin for the seeds, a location of the seeds at the processing facility, a particular container 106 in which the jar 208 is located, etc.).

Still further, the data included in the data structure 102 is representative of the system 100, as described below, from the seed gantry 110 (e.g., number of gantries, etc.) to the counting station 112*a-c* (e.g., number of counting stations and/or counters, etc.), to the sorting station 114 and to the filling station 116 (e.g., number of filling stations, sorting stations, etc.), as each is associated with the overall throughput of the system 100 (e.g., in term of cells, cassettes, or totes, per hour (or other interval), etc.), and the ability of the system 100 to fill cassettes 118 consistent with the sets of seeds to be planted. In particular, for example, the above data may include, without limitation, cassette data indicative of inventory, cell numbers, and seed counts; map data indicating of field to cassette association; and jar and tote/container data indicative of the inventory of jars and totes/containers and associations therebetween, etc.

Figure 2:
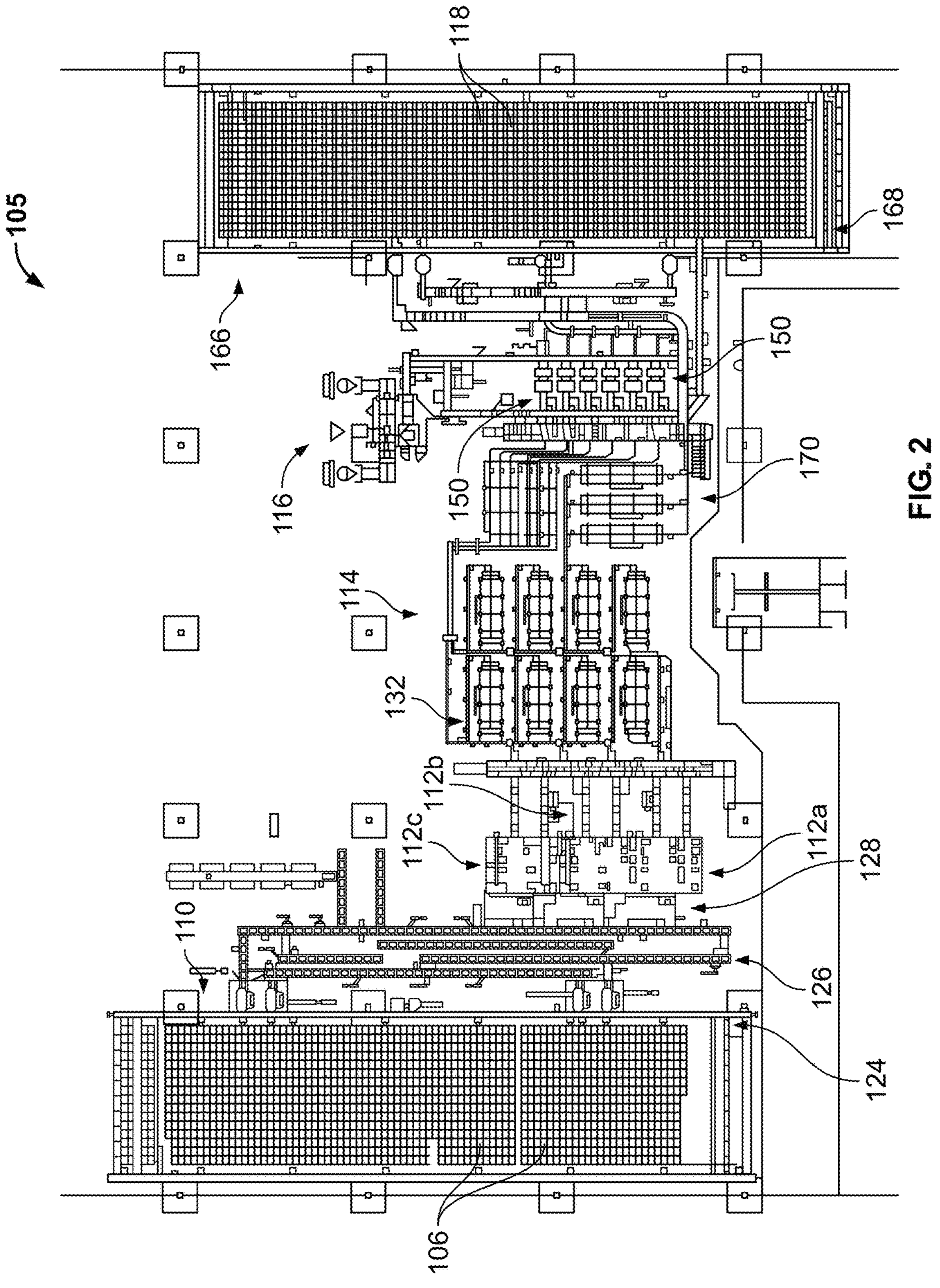
FIG. 2 illustrates a top plan view of an example seed processing facility that may be utilized in the system of FIG. 1.
Figure 3:
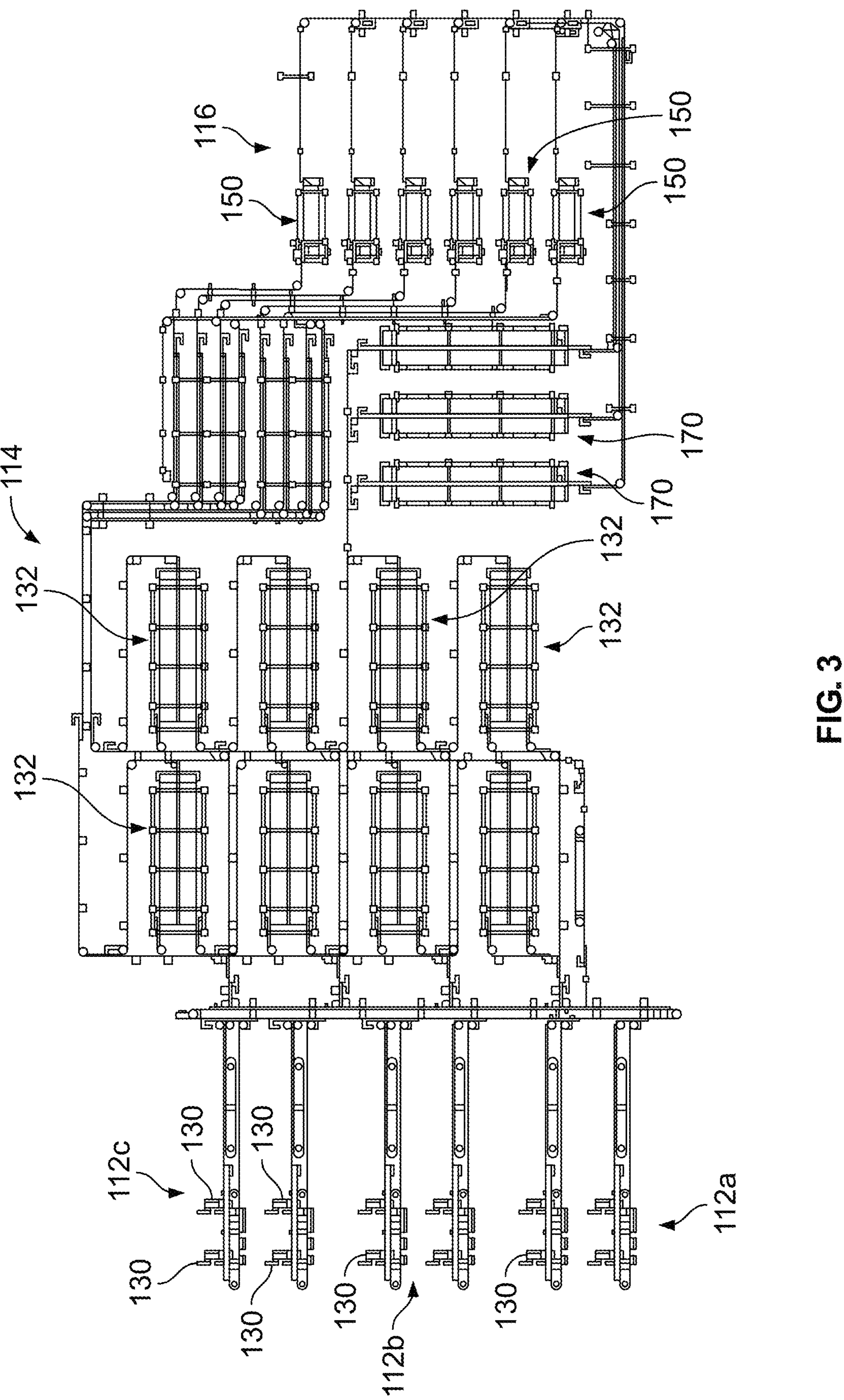
FIG. 3 illustrates an example layout of counting stations, a sorting station, and a filling station of the seed processing facility of FIG. 2.

With additional reference to FIGS. 2 and 3, in the example embodiment herein, the seed processing facility 105 of the system 100 includes the seed gantry 110, which is configured to handle multiple ones of the containers 106 and position the containers 106 for access by the counting stations 112*a-c*. In the illustrated example, the containers 106 are positioned within a storage area (e.g., within a warehouse, etc.) (broadly, a supply of seeds or seed supply) of the seed processing facility 105, and the seed gantry 110 includes a robot 124 configured to move about the storage area (e.g., horizontally, vertically, etc. on the gantry 110, etc.) to access desired ones of the containers 106. For example, the robot 124 of the gantry 102 may be configured to grip or grab individual or multiple containers 106 (e.g., when or as instructed by the scheduler 104, etc.). An example robot and gantry are described in Applicant's U.S. Pat. Application Publication No. 2021/0153438, which is incorporated herein by reference. In connection therewith, in one or more embodiments, the gantry 102 may include storage space connected to multiple sets of crane units (not shown), and the gantry 102 may include two gantries: one to store totes and the other to store cassettes. The crane units may then be configured to batch multiple units (e.g., six totes or twelve cassettes, etc.) simultaneously and place the same on one or more conveyers (not shown), whereby each is transported to the counting stations 112*a-c*. In general, depending on particular configurations, the system 100 may accommodate about 7500 totes, with each tote containing about 30 jars, for the tote gantry, and about 60,000 cassettes for the cassette gantry, based on inventory jars of about 175,000 different inventories.

The containers 106 included in the storage area of the seed processing facility 105 may be arranged, relative to the seed gantry 110, in a desired order and/or arrangement that is stored in the data structure 102. Accordingly, a location of each type of seed included in the storage area (within all of the containers 106 and jars 108) is available to, and accessible by, the scheduler 104 for use in filling cassettes. As such, the seed gantry 110 is configured (e.g., by instruction from the scheduler 104, etc.) to identify one or more desired containers 106, retrieve the container(s) 106, and then provide the container(s) 106 to counting stations 112*a-c*. In doing so, in the illustrated embodiment, the seed gantry 110 (and robot 124 thereof) is configured to deliver the container (s) 106 to a conveyor system 126 of the seed processing facility 105. And, the conveyor system 126 is configured to then transport, deliver, etc. the container(s) 106 to the counting stations 112*a-c*.

The counting stations 112*a-c* are each associated with (e.g., include, etc.) a container handling unit 128 disposed generally between the conveyor system 126 and the seed counting stations 112*a-c*. The scheduler 104 is configured to direct the container(s) 106 to the appropriate (or desired) handling unit 128, to remove selected jars 108 from the container(s) 106, and then to deliver the removed jars 108 to the corresponding one of the counting stations 112*a-c*. That said, the counting station 112*a* and container handling unit 128 associated therewith will be described next, with it understood that a description of the other counting stations 112*b-c* and container handling units 128 is the same.

The container handling unit 128 is configured to receive ones of the container(s) 106, via the conveyor system 126, and remove selected jars 108 therefrom (as instructed by the scheduler 104, etc.) (e.g., via a robotic arm, etc.). And, the container(s) 106 may be positioned in a queue associated with the container handling unit 128. The container handling unit 128 then delivers the removed jars 108 to different lanes of the seed counting station 112*a* (where the counting station 112*a* includes multiple available lanes each associated with a counter 130 and each configured to receive jars 108) (e.g., four lanes in the illustrated embodiment, etc.). In general, the lanes provide for advancement of the jars 108 toward the counting station 112*a* and, in particular, the seed counters 130 thereof (FIG. 3) (e.g., via a conveyor or other suitable mechanical machine, etc.). It should be appreciated that, in some implementations of the system 100, the ordering of the jars 106 provided in the lanes of the seed counting station 112*a* may be selected and/or predefined, and also that only jars 108 with seeds to be counted may be positioned on the lanes to the counting station 112*a*. However, in other implementations additional jars 108 may be positioned in the lanes of the counting station 112*a* and then later permitted to bypass the counting stations 112*a* (or counters 130 thereof).

Figure 8:
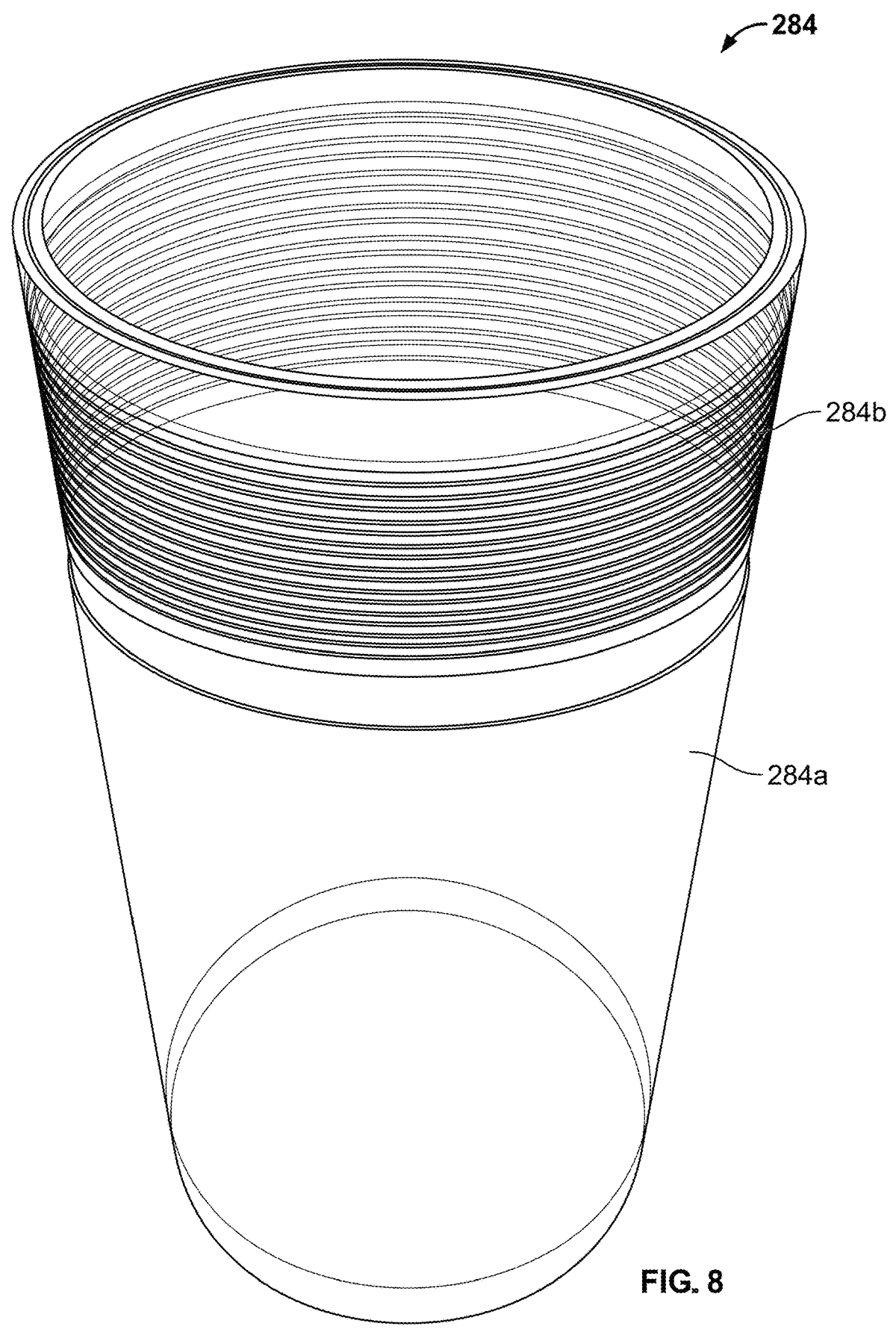

Once a jar 108 is received at the seed counting station 112*a* via one of the lanes associated therewith, for example, the seed counting station 112*a* is configured to remove a lid from a received jar 108 (or otherwise access the seeds in the jar 108) (e.g., lid 208*b* of example jar 208, etc.), and pour a quantity of the seeds into a hopper associated with a seed counter 130 at the seed counting station. The seed counter 130 (broadly, the seed counting station 112*a*) is configured to then count a desired number of seeds from the hopper and deliver the desired number of removed seeds into one or more tubes (broadly, containers) associated therewith (e.g., 20, 30, 40, 60, 81, more or fewer, etc.) (see, also, FIG. 8 illustrating example tube 284, which may be used in the system 100). In this manner, the seeds from the jars 108 in the various lanes are received by the counters 130 and then counted into the multiple tubes, sequentially, per a schedule as defined below. At about the same time, or later, the seed counting station 112*a* is configured to return the jar 108 from which the seeds were removed back to the container handling unit 128, and the container handling unit 128 is configured to position the jar 108 back in the container 106 from which it was removed (e.g., at the queue of the container handling unit 128, etc.). And, the container 106 may be transported back to the storage area via the conveyor system 106 and gantry 110.

FIG. 8, again, illustrates the example tube 284, which may be used in the system 100. As such, the example tube 284 generally includes a body 284*a* sized and shaped to contain a selected quantity of seeds, and a machine readable label 284*b* coupled to the body 284*a* (e.g., a one-dimensional or linear barcode that extending around a circumference of the tube, other machine readable labels as described herein, etc.). In this way, the particular tube 284 may be identified, tracked, etc. as it moves through the system 100.

In some embodiments, the container handling unit 128 may additionally include a queue for the jars 108 removed from the containers 106. In these embodiments, the jars 108 removed from the containers 106 may first be delivered to the queue (or accumulating area) before being conveyed to the seed counting station 112*a*. In this manner, a supply of jars 108 is always available to the scheduler 104 to be positioned in the lanes of the seed counting station 112*a*. The queuing of the jars 106 is controlled by the scheduler 104, whereby the schedule is aware of the positions of the jars 108 in the queue. Additionally, or alternatively, the container handling unit 128 may include a queue after the seed counting station 112*a*. As such, after a quantity of seeds is dispensed into one or more of the tubes at the seed counting station 112*a*, the jar 108 from which the seeds were removed may be conveyed to the queue (or seed container holding area) before the seed container is placed back into the container 106 from which it was removed. If the jar 108 is empty, it may be discarded.

An example seed counting station that may be included in the seed processing facility 105 is described in Applicant's U.S. Pat. No. 9,598,191, the entirety of which is incorporated herein by reference. However, it should be appreciated that other types of seed counting stations may be used in the facility 105 without departing from the scope of the present disclosure. For example, in some embodiments the seed counting stations 112*a-c* may be configured to deliver excess seeds from the hopper thereof back to the jar 108 from which they were removed (e.g., via a vacuum, etc.). Further, in some embodiments the counters 130 of the counting stations 112*a* may include image-based counters, whereby seeds are recognized through image processing and counted as they are moved to the tubes. The counters may alternatively include a drum or disc counter, configured to rotate, and which includes openings therein configured to receive one or more seeds, whereby rotating the drum/discs permits seeds in the opening to be collected and counted, before being passed to the tubes for further transport.

In the illustrated embodiment, the seed processing facility 105 includes three container handling units 128 and three seed counting stations 112*a-c*. And, each of the seed counting stations 112*a-c* includes four counters 130. As such, the system 100 is able to count seeds removed from 12 different jars 108 at one time. It should be appreciated that in other embodiments, the seed processing facility 105 may include different numbers of container handling units, seed counting stations, and seed counters (e.g., more or less than the numbers illustrated herein, etc.).

Figure 4:
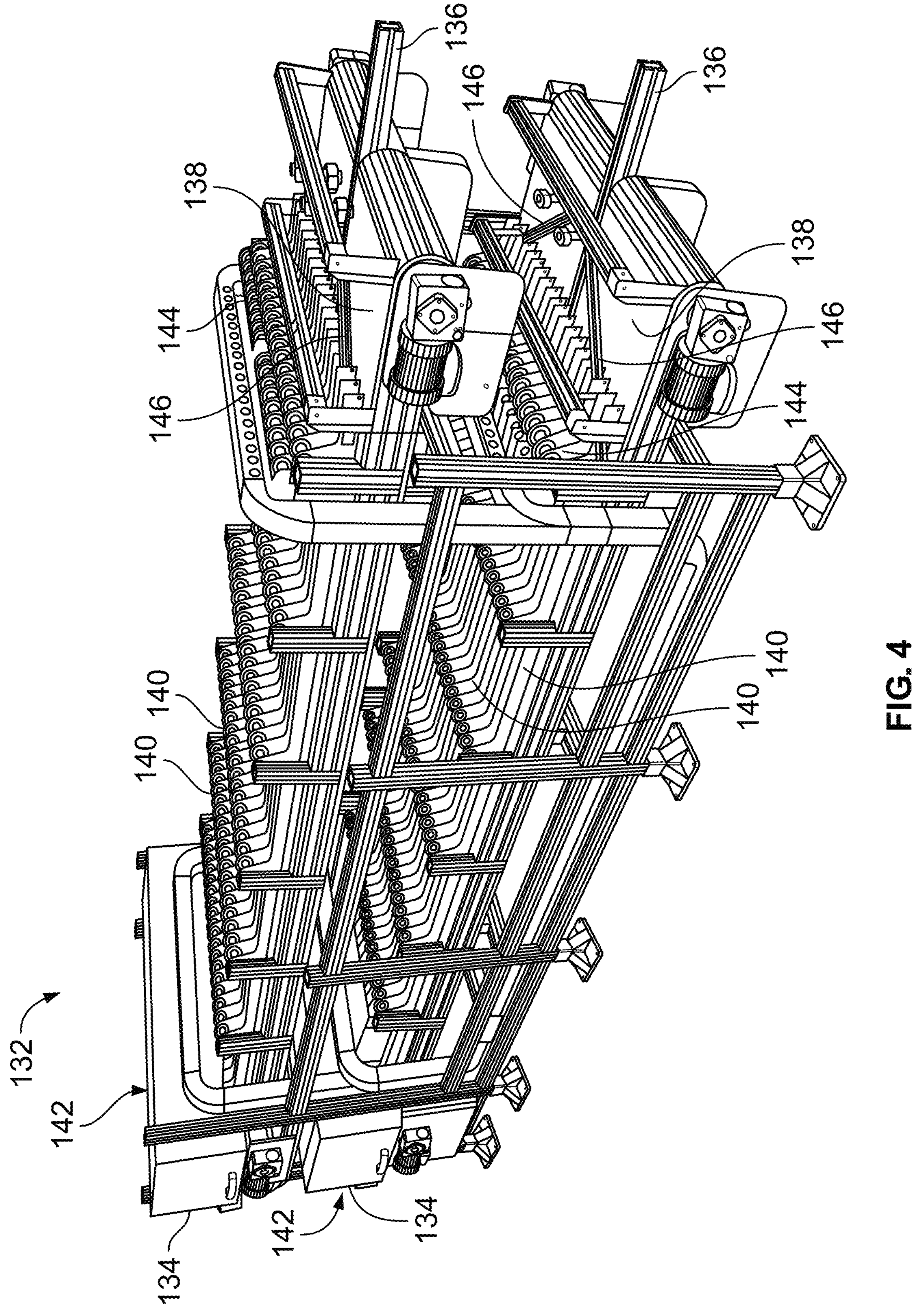
FIG. 4 is a perspective view of an example sorting table that may be included in the sorting station of the seed processing facility of FIG. 2.

Once the desired seeds, from the various jars 108, are counted into the tubes, the tubes are transported (e.g., via a conveyor assembly (as shown in FIG. 3) or other transport mechanism, etc.) to the sorting station 114 and, in particular, to one of multiple sorting tables 132 of the sorting station 114 (as determined by the scheduler 104, etc.). An example sorting table 132 of the sorting station 114 is illustrated in FIG. 4. The illustrated sorting table 132 includes upper and lower sorting levels or regions, each configured to operate in a similar manner. The upper sorting level is described herein, with it understood that a description of the lower sorting level is the same. That said, it should be appreciated that sorting tables may have other configurations in other embodiments, for example, a single level, more than two levels (e.g., three levels, etc.), etc.

As shown in FIG. 4, the sorting table 132 (for each level) in this embodiment generally includes an entrance 134 at which tubes from the counting stations 112*a-c* enter the sorting table, an exit 136 at which tubes leave the sorting table 132, and a conveyor 138 configured to transport the tubes from the entrance 134 to the exit 136. Lane barriers 140 are provided along a length of the conveyor 138 (and table 132) to define multiple lanes of the sorting table 132 in which the tubes travel. A sorting mechanism 142 is disposed at the entrance 134, and is configured to direct the tubes received from the seed counting stations 112*a-c* into particular ones of the lanes along the conveyor 138 (e.g., as instructed by the scheduler 104 based on scan data of the tubes, location data of the tubes, etc.; etc.). In doing so, the sorting mechanism 142 is configured to sequentially place each of the received tubes in the desired lane as they enter the sorting table 132. In one example embodiment, the sorting mechanism 142 includes a robotic arm configured to grip and move the received tubes to the desired lanes. In another example embodiment, the sorting mechanism 142 includes a gate or diverter configured to move the received tubes to the desired lanes.

The sorting table 132 also includes multiple gates 144 located adjacent the exit 136. Each of the gates 144 is associated with one of the lanes and is configured to selectively open and close (e.g., based on instructions from the scheduler 104, etc.). When a selected gate 144 is closed, the tubes within the corresponding lane are retained in the lane and do not exit the sorting table 132. In this manner, the tubes are lined up in the closed lane, in a queue, and accumulate as desired (e.g., based on instructions from the scheduler 104, etc.). When the selected gate 144 is open, the tubes then pass through the gate 144 and proceed to the exit 136. Generally, though, only one gate 144 is configured to open at a time, to control flow of tubes (via diverters 146) to a single lane of the exit 136 (and inhibit the tubes from jamming at the single lane of the exit 136, etc.). In doing so, each of the gates 144 (when open) may be configured to release one tube at a time from its respective lane, or the gates 144 may be configured to remain open a selected period of time to release a selected number of tubes simultaneously.

In the illustrated embodiment, the sorting station 114 includes eight sorting tables 132, each having two levels for sorting tubes of seeds (thus providing sixteen total regions or areas for sorting the tubes). In addition, each level of the sorting table 132 includes eighteen lanes. As such, the system 100 is able to sort tubes of seeds into one of 286 different lanes for further processing. It should be appreciated that in other embodiments, the seed processing facility 105 may include different numbers of sorting tables and/or sorting tables with different numbers of lanes than described and/or illustrated herein.

Figure 5:
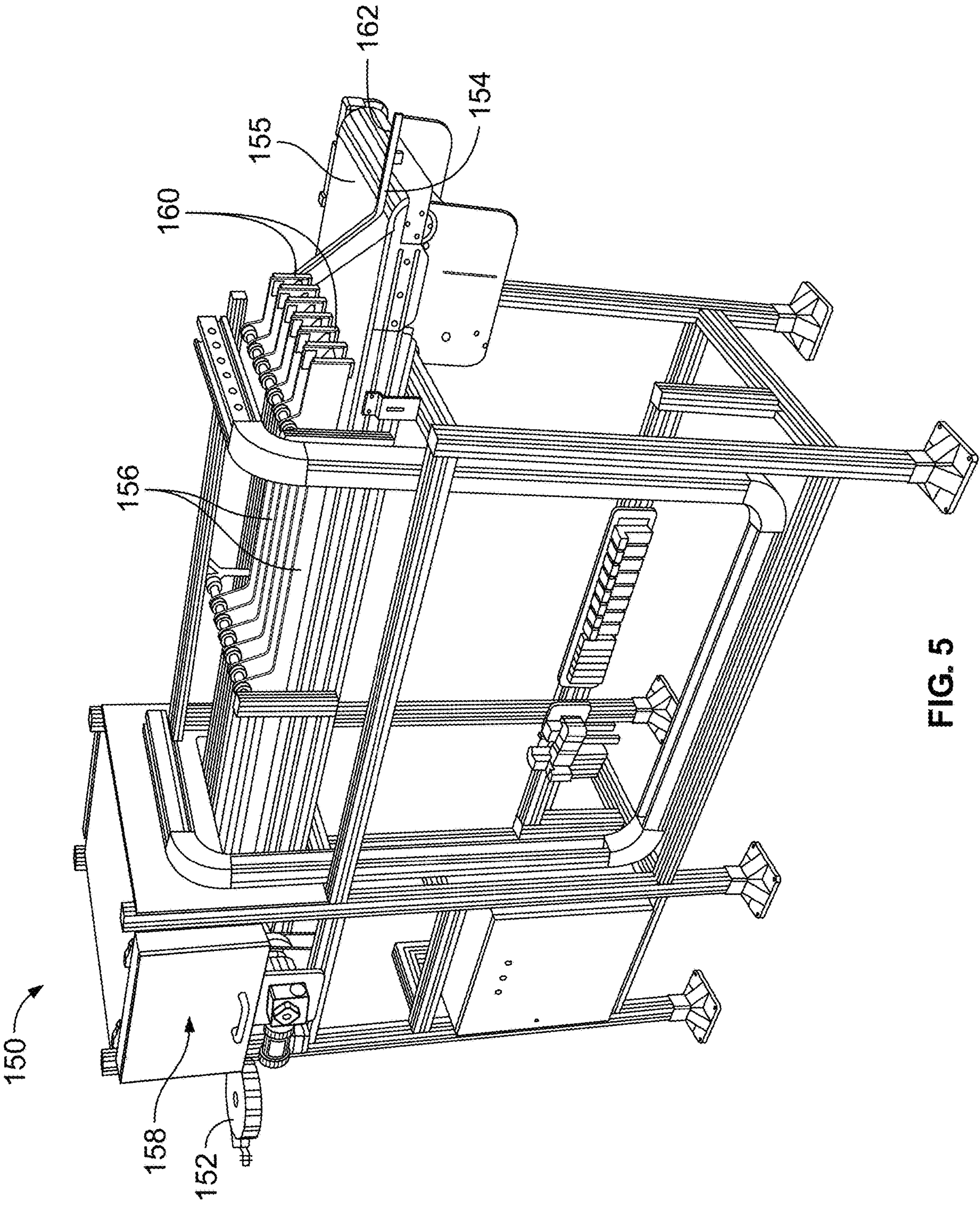
FIG. 5 is a perspective view of an example filling table that may be included in the fulling station of the seed processing facility of FIG. 2.

With reference again to FIG. 3, from the sorting station 114 (and each of the sorting tables 132), the tubes are directed or transported (e.g., via a conveyor assembly (as shown in FIG. 3) or other transport mechanism, etc.) to the filling station 116 and, in particular, to one of multiple filling tables 150 of the filling station 116 (as determined by the scheduler 104, etc.). An example filling table 150 is illustrated in FIG. 5. That said, it should be appreciated that filling tables may have other configurations (e.g., other than illustrated in FIG. 5, etc.) in other embodiments.

As shown in FIG. 5, the filling table 150 in this embodiment generally includes an entrance 152 at which tubes from the sorting station 114 enter the filing table 150, an exit 154 at which tubes leave the filing table 150, and a conveyor 155 configured to transport the tubes from the entrance 152 to the exit 154. Lane barriers 156 are provided along a length of the conveyor 156 (and table 150) to define multiple lanes of the filling table 150 in which the tubes travel. A sorting mechanism 158 is disposed at the entrance 152, and is configured to direct the tubes received from the sorting station 114 into particular ones of the lanes along the conveyor 156 (e.g., as instructed by the scheduler 104 based on scan data of the tubes, location data of the tubes, etc.; etc.). In doing so, the sorting mechanism 158 is configured to sequentially place each of the received tubes in the desired lane as they enter the filling table 150. In one example embodiment, the sorting mechanism 158 includes a robotic arm configured to grip and move the received tubes to the desired lanes. In another example embodiment, the sorting mechanism 158 includes a gate or diverter configured to move the received tubes to the desired lanes.

The filling table 150 also includes multiple gates 160 located adjacent the exit 154. Each of the gates 160 is associated with one of the lanes and is configured to selectively open and close (e.g., based on instructions from the scheduler 104, etc.). When a selected gate 160 is closed, the tubes within the corresponding lane are retained in the lane and do not exit the filling table 150. In this manner, the tubes are lined up in the closed lane, in a queue, and accumulate as desired (e.g., based on instructions from the scheduler 104, etc.). When the selected gate 160 is open, the tubes then pass through the gate 160 and proceed to the exit 154. Generally, though, only one gate 160 is configured to open at a time, to control flow of tubes (via diverter 162) to a single lane of the exit 154 (and inhibit the tubes from jamming at the single lane of the exit 154, etc.). In doing so, each of the gates 160 (when open) may be configured to release one tube at a time from its respective lane, or the gates 160 may be configured to remain open a selected period of time to release a selected number of tubes simultaneously.

In the illustrated embodiment, the filling station 114 includes six filling tables 150, thus providing six regions or areas for filling the cassettes 118 with seeds from the tubes. In addition, each filling table 150 includes six lanes. As such, the system 100 is able to direct tubes of seeds into one of 36 different lanes in preparation for filing the cassettes 118. It should be appreciated that in other embodiments, the seed processing facility 105 may include different numbers of filling tables and/or filling tables with different numbers of lanes than described and/or illustrated herein.

With reference to FIG. 2, in conjunction with the above, the system 100 is also configured to provide the cassettes 118 to the filling station 116 for receiving seeds from the tubes exiting the filling tables 150 (directly, via one or more conveyor assemblies, etc.). In the illustrated embodiment, the system includes a gantry 166 (e.g., a second gantry, a cassette gantry, etc.) and a robot 168 configured to pick up, move, and deliver the cassettes 118 to the filling station 116 (and, in particular, to each of the filling tables 150). Each cassette 118 may include one or more machine readable media, such as a bar code, RFID tag, etc. that includes information identifying the cassette. The data structure 102, then, may associate the cassette 118 with the desired seeds to be loaded in cells thereof.

That said, as the tubes leave the exit 154 of the filling table 150 (and of the other filling tables 150 of the filling station 116), the seeds in the tubes are deposited into a desired cell(s) of one or more of the cassettes 118 delivered to the filling station 116 (and filling tables 150) (e.g., based on instructions from the scheduler 104, etc.) (see, also, FIG. 6 illustrating the example cassette 218 having multiple cells 280 for receiving seeds from the tubes at the filling station 116, for example). For example, the filling station 116 may include a robotic arm or other mechanism at each of the filling tables 150 configured to grip and invert the received tube (from the exit 154 of the filling table 150) to pour the seeds therein into the desired cell(s) of the cassette(s) 118. Each cell may receive all of the seeds from a given tube, or the seeds from a given tube may be divided among two or more cells. Further, in some examples, a given cell may receive seeds from multiple tubes. In general, the cassettes 118, and the cells therein, are filled (or populated) with seeds consistent with a requested set of seeds to be planted in the field 122 (or in another field).

After the seeds from the tubes are deposited into the cassettes 118, the tubes are transported to recirculation tables 170 of the system 100 (e.g., via one or more conveyor assemblies, etc.) (FIG. 3), where they are then directed back to the sorting station 112 for subsequent use.

Referring again to FIG. 1, after filling the cassettes 118, the filled cassettes are transported to the field 122, for example, and loaded onto farm implement 120 (e.g., a planter, etc.). The farm implement 120 is configured, then, to plant the seeds, as dispensed from the cassettes 118, in the field 122, whereby the field 122 is planted consistent with the give trial or experiment, and requested set(s) of seeds. That said, it should be appreciated that time constraints may exist, to have the cassettes 118 filled through the system 100 so that the sets of seeds in the cassettes 118 may be planted in the field 122 consistent with a planting schedule at a specified time (or within a specified time range or window). The same applies for sets of seeds required for other fields and cassettes filled and directed to such other fields.

In connection with the above, an ID of each of the jars 108 removed from the container(s) 106 and delivered to the seed counting stations 112*a-c* is tracked by the scheduler 104, such as by sensors (e.g., scanners, imaging devices, etc.) disposed throughout the system 100 configured to read the machine readable codes of the container(s) and/or jars 108. In addition, an ID of each of the tubes into which seeds are delivered by the seed counting stations 112*a-c* is tracked by the scheduler 104, again by the sensors disposed throughout the system 100, for example, reading machine readable codes thereof at the seed counting stations 112*a-c*, at the sorting tables 132, at the filling tables 150, at the conveyor assembly (ies) interconnecting the components of the system 100, etc. In this manner, the scheduler 104 is provided with the particular location of each of the containers 106 and jars within the system 100, at a particular time, and the particular seeds therein. Such data may be stored in the data structure 102, as desired.

In view of the above, it should be understood that there is a time cost associated with unloading jars 108 from the containers 106, and also changing jars 108 for each of counters 130 of the seed counting stations 112*a-c* (before and after counting, etc.). There is also a time cost associated with filling the cassettes and recirculating the tubes. For example, unloading 30 jars from a container and removing lids therefrom may take about 150 seconds in the seed processing facility 105, while switching jars at a counter of a seed counting station (from a current jar to a next jar) may take about 8 seconds, etc. Such time costs must be account for in managing operation of the facility 105 to timely fulfill seed requests.

In addition, an inventory of seeds in the seed processing facility 105 is often maintained not only in the containers 106 (and jars 108) but also in the tubes moving through the facility 105. For example, the tubes filled with seeds are configured to hold the seeds as they move through the seed processing facility 105, until the seeds are transferred to one or more of the cassettes (to define sets of seeds in the cassettes). In other words, the seeds remain in the tubes until needed to fill one or more of the cassettes 118. In addition, empty tubes are collected at the recirculation tables 170, and new containers 106 and/or jars 108 may be delivered to and/or introduced to the seed processing facility. As such, the seed processing facility 105 (and the system 100, more generally), may hold, in transit, several containers 106, several jars 108, several tubes, and several cassettes, in differing states of being filled with seeds, partially filled with seeds, or empty. Additional factors that may affect operation of the seed processing facility include, for example, the potential inclusion of thousands or tens of thousands or hundreds of thousands of different seeds at the seed processing facility 105; the hundreds or thousands of potential requests for sets of seeds at the seed processing facility; the availability of seeds at the seed processing facility 105 to be included in cassettes 118 in response to the requests; the availability of the jars containing those seeds at a given time;

the order in which containers 106 are retrieved by the gantry 110; which particular containers 106 are to be loaded into the seed gantry 110; availability of tubes; an order in which cassettes 118 are to be filled; an availability of seeds to complete required sets for the cassettes; etc. Such factors may impact the overall efficiencies of the system 100 and, again, ability to timely fulfill seed requests.

As such, in this example embodiment, the system 100 includes the scheduler 104, which is coupled to (and in communication with) the seed processing facility 105 (and the components thereof (e.g., the seed gantry 110, the counting stations 108, the sorting station 114, the filling station 116, etc.), etc.), and is configured to schedule delivery, transfer, etc. of seeds from the containers 106 to the cassettes 118, to provide efficient and timely filling thereof in response to planting requests.

In particular, at the outset, the scheduler 104 is configured to consider an interval, such as, for example, a number of days, weeks (e.g., 18 weeks, etc.), for which the cassettes 118 are to be scheduled to be filled, based on a number of factors. The factors may include, without limitation, availability and/or estimated availability of seeds to the system 100 and limited access to maps defining the sets to be planted in various fields, any of the one or more factors described above with regard to the seed processing facility 105, etc. As such, the scheduler 104 is configured to determine a schedule to fill one or more of the cassettes 105 (with particular sets of seeds), and then to provide instructions to the seed processing facility 105 (e.g., to a centralized computing device at the seed processing facility 105, to each of the components of the seed processing facility 105, etc.) consistent with the schedule. The scheduler 104 may be configured in a number of manners to determine the schedule, including according to the models described below.

In one example embodiment, the scheduler 104 is configured to employ a sequential, stochastic decision-making model, which includes various parts, for example: a decision point, a state, an action, a reward, a transition, and an objective, as defined below.

In particular in this example, R includes a set of all reps (e.g., seed sets (or requests for seed sets) required to be processed by the system 100, etc.) and R is a total number of the reps. Each rep, then, is associated with a deadline, $d_r$ for $r \in R$. In connection therewith, i is a set of all inventories (or seeds) available to satisfy a rep, and I is a total number of different inventories (or seeds) available. In addition, $b_{ir}$ is a number of tubes of inventory, i, needed by rep r, and $j_{it}$ is a number of tubes of inventory, i, available for processing in a time period, t (e.g., a week, etc.). Further, c is a minimum number of tubes of any inventory that can be filled in the time period, and the value q indicates a maximum number of tubes that can be scheduled for the time period. With that, the decision point identifies the time at which a decision is made, which is represented as $t \in \{0, 1, \ldots T\}$, and the state represents information known at the time of the decision, which is represented as a tuple $s_t=(j_t, m_t)$, where $j_t$ is a vector representing the number of tubes of each type of seed available at the start of the time period, t, where $m_t$ is a vector representing the reps known and unfilled at time period t, and where $d_t$ is a vector indicating when each rep is due.

The actions are the set of feasible decisions that are available given a state $s_t$. The set of decisions is denoted as $X_t(s_t)$. An action $x_t \in X_t(s_t)$ is a vector indicating what reps are filled in the time period, t, given state $s_t$. For this purpose, $x_{rt}$ is a binary variable indicating whether a plan exists to complete rep r in the time period, t, or not. To define the feasible actions, the binary variable $y_{it}$ indicates that use of inventory i is greater than the minimum required tubes. An action $x_t \in X_t(s_t)$ is then feasible if:

$$cy_{it} \leq \sum_{r=1}^{R} x_{rt} b_{ir} \leq j_{it} y_{it}, \forall i = 1, \ldots, I \tag{1}$$

$$\sum_{r=1}^{R} \sum_{i=1}^{I} x_{rt} b_{ir} \leq q, \tag{2}$$

$$x_{rt} \in \{0, 1\}, \forall r \in m_t, \tag{3}$$

$$x_{rt} = 0, \forall r \in R \backslash m_t, \tag{4}$$

$$y_{it} \in \{0, 1\}, \forall i = 1, \ldots, I. \tag{5}$$

In the above, Constraint (1) limits the feasible action to the inventory i at the start of the time period, t, while using at least c tubes of the inventory i. Constraint (2) is a limit of tubes to the available capacity in counting, and Constraint (3) limits the scheduling of reps for available maps while Constraint (4) limits completing reps for unknown maps. Finally, Constraint (5) provides for the integrality of the variable y.

With the objective of minimizing the total expected delay over the horizon, the reward in each time period is the total number of reps that are left unfilled at the end of the period whose deadline has passed. To express this mathematically, then, $R_t$ represents the reps whose deadlines $d_r$ are less than or equal to the time period, t, and that have not yet been filled at time period t (as in Equation (6)).

$$C(s_t, x_t) = \sum_{r \in \widehat{R_t}} (1 - x_{rt}) \tag{6}$$

After the action is selected, the state undergoes a transition. The transition represents the impact of the selected action but also the random outcomes that occur over the period. The state resulting from the realization of random information, $w_t$, arriving between time period t and time period t+1 is the new pre-decision, $$\text{state } s_{t+1} = S^M(s_t, x_t, w_t) = S^M(s_t^{x_t}, w_t),$$

at time period t+1 and represents the information that will be used to make a decision at the start of time period t+1. The random information $w_t$ includes, in this example, three parts. The first part represents the new inventories of seed that become available between time period t and time period t+1, which includes seeds shipped to the seed processing facility 105 between time period t and time period t+1. The second part is new maps that become known between time periods t and t+1, which determines what reps are available to be filled in time period t+1. And, finally, it is possible that the system 100 may not complete all of the reps previously scheduled to be filled in time period t (e.g., due to a lack of available source seeds in containers 106, etc.). Such information identifies exactly what reps for which the action selected $x_{rt}=1$ were filled in time period t, whereby previously scheduled reps will be filled at time period t+1 or later.

Given the above, the model further includes an objective function, which is expressed in Equation (7) below.

$$\min_{\pi\in\Pi} E\left[\sum_{t=0}^{T} C(s_t, \delta_t^{\pi}(x_t))\right], \tag{7}$$

where $\pi$ is a policy that determines actions for all days, for example, of time period t over the problem horizon T, $\Pi$ is the set of all policies, and $$\delta_t^{\pi}(s_t)$$

is a decision rule specific to the policy $\pi$ that maps the state $s_t$ to a feasible action $x_t$.

It should be appreciated that the post-decision states are also defined in this example embodiment. A post-decision state is what is known about after a decision $x_t$ in time period t is made, but before observation of exogeneous information that will define the transition to time period t+1. The post-decision state is represented by $s_{xt}$. In the context of scheduling reps (e.g., fulfillment of seed set requests, etc.) in the system 100, the post-decision state is the reps that are left to be filled in remaining time periods after $x_t$ is selected. It is understood that Equation (7) may be solved by using backward induction applied to the following Equations (8) and (9).

$$V(s_t) = \max_{x\in X(s_t)} \{R(s_t, x) + V(s_t^x)\} \tag{8}$$

$$\text{with } V(s_t^x) = \mathbb{E}[V(s_{t+1}) \mid s_t^x]. \tag{9}$$

That said, the scheduler 104 is configured to employ approximate dynamic programming, which relies on a forward approach that traverses a Markov Decision Process (MDP) from an initial to final state. However, in stepping forward, the second term of Equation (8) is unknown and must be approximated. As a result, the scheduler 104 is configured to operate on the approximate equation given by the following Equation (10).

$$\hat{V}(s_t) = \max_{x\in X(s_t)} \{R(s_t, x) + \hat{V}(s_t^x)\}. \tag{10}$$

It should be appreciated that various techniques may be employed to create the approximation. One example includes a myopic approach that sets the second term of Equation (10) to zero as a starting point. In different embodiments, however, in connection with the impact of the current state decision on future decisions and orders, values of the second term in Equation (10) may also be learned, for example, through value function approximation by linear basis function.

In connection therewith, basis functions are defined, where the basis functions may define the state into one or more smaller set of features. As an example, a basis function may generally take the form of $$\textstyle\sum_{j=1}^{J} \theta_{jt}\phi_{jt}(s_t^{x_t}), \text{ where } \phi_{jt}(s_t^{x_t}),$$

which maps a post-decision state $$s_t^{x_t}$$

or a summary of the post-decision state to a real number and where each $\theta_{jt}$ is a real-valued weight or coefficient. Other basis functions may be used within the scope of the present disclosure. Different weights are learned for each time period t. With the above basis function, then, Equation (10) is revised as $$\hat{V}(s_t) = \max_{x\in X_t(s_t)} \left\{C(s_t, x) + \sum_{j=0}^{J} \theta_{jt}\phi_{jt}(s_t^x)\right\}. \tag{11}$$

Approximating the second term of Equation (11) as a linear basis function permits reformulation of Equation (11) as an integer program with the introduction of the variable $z_{ikr}$ that takes the value of 1 if the $k^{th}$ unit of inventory i associated with rep r is fulfilled, and 0 otherwise, and where $r_i$ represents the number of tubes of inventory i in rep r and R the total number of reps.

In connection with the above, reps are aggregated by relative maturity (RM), which is associated with an interval until maturity of a crop, whereby the number of variables in the basis function is reduced. Further, the binary variable $u_r$ indicates whether the deadline of rep r is missed if r is not produced in time period t. It should be appreciated that variables need only exist for reps whose deadline is time period t or earlier, whereby $R_t$ is the set of reps whose deadlines $d_r$ are less than or equal to time period t and that have not yet been filled at time period t, and $R_t$ is the cardinality of $R_t$. To limit delay, $\delta_{rt}$ is marginal cost of delaying rep r one more time period, where $\delta_{rt}$ may be set to 1. Or, a function $fr$ may be employed to determine $\delta_{rt}$ where the value of $\delta_{rt}$ is the marginal value of delaying rep r from time period t to time period t+1 or $\delta_{rt}=f_r(t+1)-f_r(t)$.

In view of the above, if $\mu_{mt}$ is the number of reps of RM, m, that are known and need to be filled at the start of time period t, and $z_{mr}$ is 1 if rep r belongs to RM, m, and 0 otherwise. Consequently, the scheduler 104 is configured to determine which rep is to be completed in a current time interval, based on the priority of the rep in terms of deadline, which is calculated as provided below for each time period t.

$$(P)\,\hat{V}_t(s_t) = \min \sum_{r\in\widehat{R_t}} u_t\delta_{rt} + \sum_{m=1}^{M} \theta_{mt}\left(\mu_{mt} - \sum_{r=1}^{R} z_{mr}x_{rt}\right)$$

$$\text{s.t. } cy_{it} \le \sum_{r=1}^{R} x_{rt}b_{ir} \le j_{it}y_{it}, \forall i = 1, \ldots, I \tag{12}$$

$$\sum_{r=1}^{R}\sum_{i=1}^{I} x_{rt}b_{ir} \le q, \tag{13}$$

$$x_{rt} \ge (1-u_r), \forall r = 1, \ldots, \widehat{R_t}, \tag{14}$$

$$u_r \in \{0, 1\}, \forall r = 1, \ldots, \widehat{R_t}, \tag{15}$$

$$x_{rt} \in \{0, 1\}, \forall r = 1, \ldots, R, \tag{16}$$

$$y_{it} \in \{0, 1\}, \forall i = 1, \ldots, I. \tag{17}$$

The first term of the above objective (P) minimizes the delay associated with the reps whose deadline is time period t or earlier, and priority is given to reps whose deadline is earlier than time period t, and the third term focuses on the reps remaining for each RM. Constraints (12)-(17) consistent with the above are further included, and also, Constraint (14) activates the u variable when a deadline is missed, thereby permitting a count of the number of missed deadlines, and Constraint (15) ensures that the u variables are binary. Constraints (16) and (17) provide for the integrality of the x variables and y variables, respectively.

Next, to determine the theta values, θ, for the objective (P), an approximate value iteration is combined with regression. An algorithm such as Approximate Post-Decision Value Iteration (AVI) may be used (which may be referred to as reinforcement learning). AVI is a simulation procedure that uses sample paths of the problem to develop estimates of the coefficients. In the illustrated embodiment, a form of AVI is employed, by the scheduler 104, which uses batch updates, to estimate basis function parameters. Parallel processing may further be employed. That said, it should be appreciated that an iterative model may also be employed.

That said, Algorithm 1 provided in Table 1 includes a solution approach for the system 100, which makes use of a forward pass and a backward pass. Using the forward and backward passes permits the scheduler 104 to update estimates of the reward-to-go, the second term in Equation (10), with observed rather than approximate values. As a result, the algorithm tends to learn the θ values more efficiently. In Step 1 in Table 1, the coefficients of the basis function are initialized. For example, the values may be initialized to 0. Alternatively, θ values may be initialized to prior values or simulated values. Next, the algorithm is run for N iterations, updating the θ values at each iteration. For each of the n iterations of the algorithm, Step 2 (in Table 1) sets the values based on the iteration $\theta^n$ values. At Steps 3 to 8, the scheduler 104 is configured to provide the forward pass of the algorithm. In the forward pass, Step 4 sets an initial state $$s_0^n$$

for iteration n. The forward pass then creates a trajectory of states, actions, and outcomes using the current coefficient estimates ($\theta^n$) by repeatedly solve objective (P). The transition from pre-decision state to pre-decision state is determined by a sample resulting from a one-period run of the system 100 simulation. The forward pass steps through to the planning horizon.

Further, at steps 9 through 13 in Table 1, the scheduler 104 is configured to move backward through time, updating the reward-to-go with each visited post-decision state. Finally, at step 14, the scheduler 104 is configured to update the value of θ using the values computed during the backward pass.

TABLE 1

| Algorithm 1 Approximate Post-Decision Value Iteration Using Linear Basis Functions |
| --- |
| 1: Initialization: Initialize $\theta^0$. |
| 2: for n = 0, . . . , N do |
| 3: Forward Pass: |
| 4: Set an initial state $\hat{s}_0^n$. |
| 5: for t = 0, . . . , T do |
| 6: Solve model (P) using $\hat{s}_t^n$ and setting $\theta_t = \theta_t^n$ to get $\hat{x}_t^n$. |
| 7: Apply the system dynamics: set $\hat{s}_{t+1}^n = S^M(\hat{s}_t^n, \hat{x}_t^n, \hat{\omega}_t^n)$ where $\hat{\omega}_t^n$ represents the random outcome of the CSP simulation of period t. |
| 8: end for |
| 9: Backward Pass: |
| 10: Initialize the backward pass setting $\hat{v}_T^n = 0$. |
| 11: for t = T − 1, . . . , 0 do |
| 12: Value function update: Set $\hat{v}_T^n = C(\hat{s}_{t+1}^n, \hat{x}_{t+1}^n) + \hat{v}_{t+1}^n$. |
| 13: end for |
| 14: Update $\theta^{n+1}$ using the values $\hat{v}_t^n$. |
| 15: end for |

Algorithm 1 presents an AVI in which the θ parameters are updated at each iteration n. At each iteration, the algorithm generates sample states and values, where the values are used to estimate the coefficients of the basis function. For iteration n of Algorithm 1, the scheduler 104 is configured to rely on $$\left\{\left(\hat{s}_t^{\hat{x}_t,n}, \hat{v}_n^n\right), t \in T\right\}$$

as the sequence sample post-decision states and approximate values generated by solving Steps 6 and 12 of Algorithm 1, respectively. These values define a set of feature-value pairs, where the feature is treated as the independent variable and the estimated post-decision state value is treated as the dependent variable. Thus, coefficients of the basis function are determined, by the scheduler 104, using linear regression (e.g., recursive least squares regression, etc.). The set of coefficients are determined to limit squared errors of the states traversed through the iteration of Algorithm 1.

The regression procedure updates the value of θ at each iteration n of Algorithm 1, where an update is performed for each time period t. For each time period, t, updating utilizes two values:

$$\hat{\epsilon}_t^n \text{ and } H_t^n,$$

computer as provided below:

$$\hat{\epsilon}_t^n = \hat{v}_t^n - (\theta_t^{n-1})^T \phi(\hat{s}_t^{\hat{x}_t,n}). \tag{18}$$

$$B_t^n = B_t^{n-1} - \frac{1}{\gamma_t^n}\left(B_t^{n-1}\phi(\hat{s}_t^{\hat{x}_t,n})\left(\phi(\hat{s}_t^{\hat{x}_t,n})\right)^T B_t^{n-1}\right), \tag{19}$$

where $$\gamma_t^n = 1 + \left(\phi(\hat{s}_t^{\hat{x}_t,n})\right)^T B_t^{n-1}\phi(\hat{s}_t^{\hat{x}_t,n}). \tag{20}$$

$$H_t^n = \frac{1}{\gamma_t^n}B_t^{n-1}. \tag{21}$$

In connection therewith, the matrix $B_t$ is initialized. In one example, $$B_t^0 = \lambda I,$$

where I is the identity matrix and λ is a small constant determined through experimentation.

From the above, the scheduler 104 is configured to update Θ, based on:

$$\theta_t^n = \theta_t^{n-1} - H_t^n \phi^n \hat{\epsilon}_t^n. \tag{22}$$

For the above planning of filling the cassettes, the scheduler 104 may be configured to employ an alternative to Algorithm 1, which is presented below as Algorithm 2 in Table 2. Algorithm 2 is a version of AVI that relies on a batch of data at each iteration n.

In particular, in Step 1 of the batch algorithm (Algorithm 2), the scheduler 104 is configured to initialize the coefficients of the basis function θ. Consistent with Algorithm 1, the initialization may be based on setting values to zero, or by using real values or simulated values. Next, the Algorithm 2 is run for n iterations, updating the θ values at each iteration. For each of the n iterations of the algorithm, Step 2 (in Table 2) collects a batch of data based on the current iteration $\theta^n$ values. The main difference, then, between Algorithm 1 and Algorithm 2 is Step 3 that gathers a batch of K+1 values for each of the $\theta^n$ values produced by the Algorithm 2. Steps 4 to 15, then, are generally the same as in Algorithm 1. Step 16 updates the $\theta^n$ values using the gathered batch of samples. As for the update, for each time, t, the Algorithm 2 is provided the corresponding K+1 post-decision state and approximate value pairs $$\left\{\left(\hat{s}_t^{\hat{x}_t,nk}, \hat{v}_t^{nk}\right), k = 0, \ldots K\right\}$$

generated by Steps 7 and 16 of Algorithm 2, respectively, and $$\hat{\theta}_t^n$$

is then defined by Equation (23).

$$\hat{\theta}_t^n = \underset{\hat{\theta}}{\operatorname{argmin}} \frac{1}{K+1}\sum_{k=0}^{K+1}\left[\hat{\theta}\phi(\hat{s}_t^{\hat{x}_t,nk}) - \hat{v}_t^{nk}\right]^2, \tag{23}$$

Equation (23) is solved, by the scheduler 104, by a typical square requestion, given that $$\theta^{n-1}\phi(\hat{s}_t^{\hat{x}_t,nk})$$

is linear in this example. Next, the scheduler 104 is configured to update θ, based on Equation (24).

$$\theta_t^n = (1-\alpha_{n-1})\theta_t^{n-1} + \alpha_{n-1}\hat{\theta}_t^n, \tag{24}$$

where $0<\alpha_n\leq 1$ for all n. The α values are hyperparameters, which are generally determined experimentally. It should be appreciated that the period, t, may be defined as a feature of the problem rather than using a separate basis function for each period in various other embodiments.

TABLE 2

| Algorithm 2 Approximate Post-Decision Value Iteration Using Linear Basis Functions Using Batch Data |
|---|
| 1: Initialization: Initialize $\theta^0$. |
| 2: for n = 0, . . . , N do |
| 3: for k = 0, . . . , K do |
| 4: Forward Pass: |
| 5: Set an initial state $\hat{s}_0^{nk}$. |
| 6: for t = 0, . . . , T do |
| 7: Solve model (P) from Section 3 using $\hat{s}_t^{nk}$ and setting $\theta_t = \theta_t^n$ to get $\hat{x}_t^{nk}$. |
| 8: Apply the system dynamics: set $\hat{s}_{t+1}^{nk} = S^M(\hat{s}_t^{nk}, \hat{x}_t^{nk}, \hat{\omega}_t^{nk})$ where $\hat{\omega}_t^{nk}$ represents random outcome of the CSP simulation of period t. |
| 9: end for |

TABLE 2-continued

| Algorithm 2 Approximate Post-Decision Value Iteration Using Linear Basis Functions Using Batch Data | |
|---|---|
| 10 | Backward Pass: |
| 11: | Initialize the backward pass setting $\hat{v}_T^{nk} = 0$. |
| 12: | for t = T − 1, . . . , 0 do |
| 13: | Value function update: Set $\hat{v}_T^{nk} = C(\hat{s}_{t+1}^{nk}, \hat{x}_{t+1}^{nk}) + \hat{v}_{t+1}^{nk}$. |
| 14: | end for |
| 15: | end for |
| 16: | Update $\theta^{n+1}$ using the values $\hat{v}_t^n$, for every k = 0, . . . , K. |
| 17: | end for |

In addition to the above, the scheduler 104 may be configured to prioritize the reps in manners different than the above. For example, the scheduler 104 may be configured to extend the time period t, by weighting each rep r by $\lambda_r = T-(d_r-t)$, where T is the end of the planning horizon for the reps of the schedule. This example weighting, then, may make reps whose deadlines are closest the most valuable, and may place additional value on any reps whose deadline has passed at time t. In connection therewith, R is the total number of reps and I is the inventory, in defining the objective function (P") below, along with corresponding Constraints (25)-(28).

$$(P'')\hat{V}_t(s_t) = \max \sum_{r \in \widehat{R_t}} \lambda_t x_{rt}$$

$$\text{s.t. } cy_{it} \leq \sum_{r=1}^{\widehat{R_t}} x_{rt} b_{ir} \leq j_{it} y_{it}, \forall i = 1, \ldots, I \tag{25}$$

$$\sum_{r \in \widehat{R_t}} \sum_{i=1}^{I} x_{rt} b_{ir} \leq q, \tag{26}$$

$$x_{rt} \in \{0, 1\}, \forall r = 1, \ldots, \hat{R}, \tag{27}$$

$$y_{it} \in \{0, 1\}, \forall i = 1, \ldots, I. \tag{28}$$

In the above, $\hat{R}_t$ is the set of reps whose deadlines $d_r$ are less than or equal to time period t and that have not yet been filled at time period t, and $R_t$ is the cardinality of $\hat{R}_t$; $b_{ir}$ is the number of tubes of inventory i needed by rep r, and $j_{it}$ is the number of tubes of inventory i available for processing in week t; $x_{rt}$ is a binary variable indicating the plan to complete rep r in week t; and $y_{it}$ is a binary variable indicating that the use of inventory i is greater than some minimum number of tubes c; and q is the maximum number of tubes that can be scheduled for a week t.

In addition in the objective function (P"), the first term of the objective maximizes the value of the reps that are filled in period t. Constraint (25) provides use of tubes of inventory I, which is the available tubes at the start of week t but not less than c tubes of inventory i. Constraint (26) limits the number of scheduled tubes to the available capacity in counting, while Constraint (27) provides for the integrality of the x variable, and Constraint (28) provides for the integrity of the y variables.

Based on the above, the scheduler 104 is configured to determine the schedule to fill the different cassettes 118 based on incoming requests for sets of seeds. The scheduler 104 is configured to leverage the above analysis to determine the value of different rep features in different time periods. As part of training, the value of each rep is set to zero, or a generic value, and by running the multiple scenarios, the scheduler 104 is configured to determine and/or converge to usable θ values. Thereafter, based on the trained θ values, the scheduler 104 is configured to determine (P) for each time period. The output of the model or schedule defines what reps will be filled in what period.

Thereafter, as indicated above, the scheduler 104 is configured to impose the schedule on the seed processing facility 105. For instance, the scheduler is configured to direct the seed gantry 110 to retrieve proper containers 106 and/or order the containers 106 in a particular order to ensure the proper seeds are provided for fulfilling a request. The scheduler 104 is configured to further direct the counting stations 112*a-c* to remove seeds from appropriate jars 108 of the containers 106 and deliver the appropriate seeds and numbers of seeds to the tubes. And, also, the scheduler 104 is configured to coordinate between the sorting station and the filling station to ensure cassettes are proper positioned and then filled with the seeds from the tubes, as counted by the counting stations 112*a-c*, consistent with the specific sets of seeds required for the cassettes. It should be appreciated that the scheduler 104 may be configured to re-generate the schedule from time to time, or at various intervals, as needed to ensure changes in the maps, sets, cassettes, etc., are accounted for in the schedule.

Figure 9:
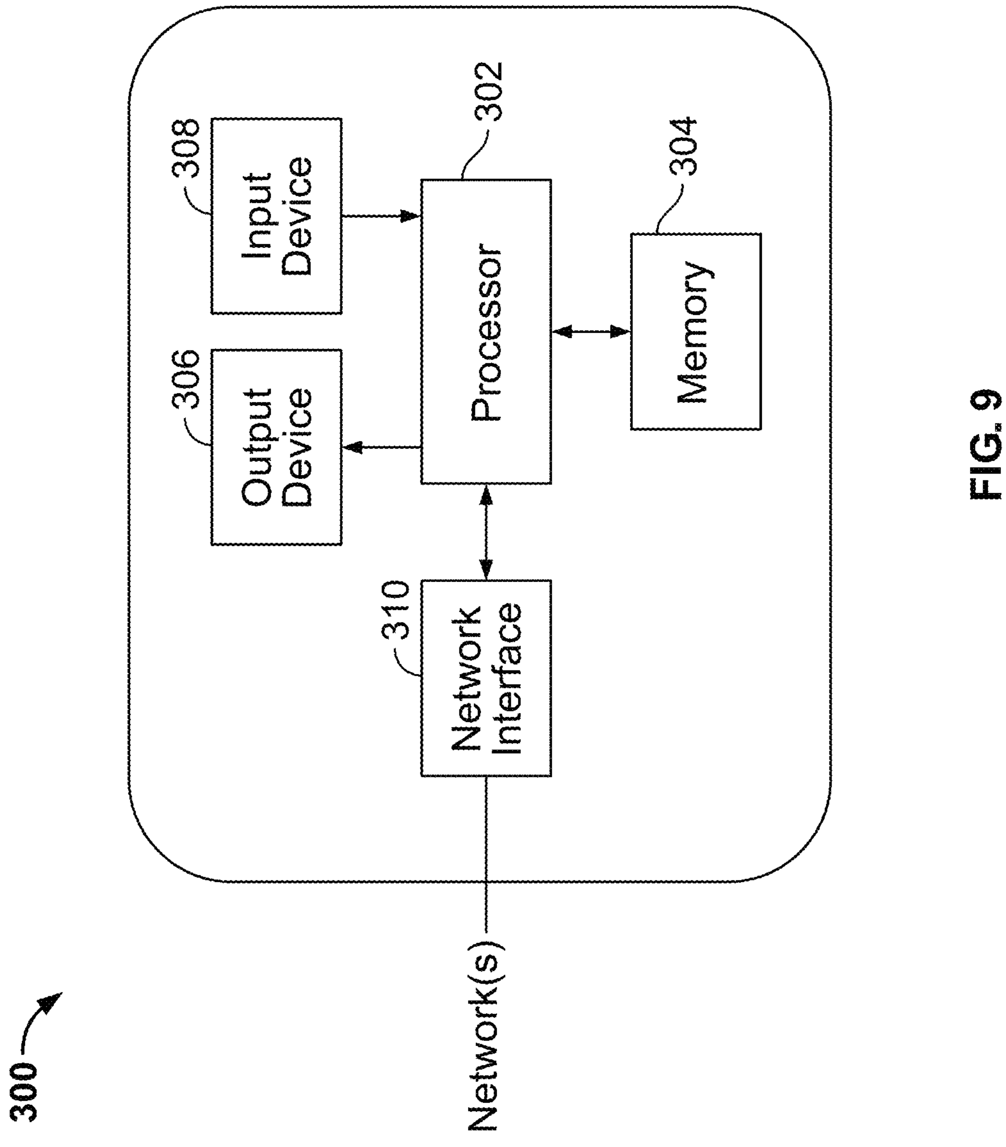
FIG. 9 is a block diagram of an example computing device that may be used in the system of FIG. 1 and/or the seed processing facility of FIG. 2.

FIG. 9 illustrates an example computing device 300 that may be used in the system 100 of FIG. 1. The computing device 300 may include, for example, one or more servers, workstations, personal computers, laptops, tablets, smartphones, virtual devices, etc. In addition, the computing device 300 may include a single computing device, or it may include multiple computing devices located in close proximity or distributed over a geographic region, so long as the computing devices are specifically configured to operate as described herein. In the example embodiment of FIG. 1, the scheduler 104 includes and/or is implemented in one or more computing devices consistent with computing device 300. The database 102 may also be understood to include and/or be implemented in one or more computing devices, at least partially consistent with the computing device 300. However, the system 100 should not be considered to be limited to the computing device 300, as described below, as different computing devices and/or arrangements of computing devices may be used. In addition, different components and/or arrangements of components may be used in other computing devices.

As shown in FIG. 9, the example computing device 300 includes a processor 302 and a memory 304 coupled to (and in communication with) the processor 302. The processor 302 may include one or more processing units (e.g., in a multi-core configuration, etc.). For example, the processor 302 may include, without limitation, a central processing unit (CPU), a microcontroller, a reduced instruction set computer (RISC) processor, a graphics processing unit (GPU), an application specific integrated circuit (ASIC), a programmable logic device (PLD), a gate array, and/or any other circuit or processor capable of the functions described herein.

The memory 304, as described herein, is one or more devices that permit data, instructions, etc., to be stored therein and retrieved therefrom. In connection therewith, the memory 304 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable media for storing such data, instructions, etc. In particular herein, the memory 304 is configured to store data including, without limitation, seed data; inventory data; seed set request data (including maps associated therewith, etc.); location data of seeds in the seed processing facility 105; scan data associated with containers, jars, and tubes; scheduling data; model architectures; and/or other types of data (and/or data structures) suitable for use as described herein.

Furthermore, in various embodiments, computer-executable instructions may be stored in the memory 304 for execution by the processor 302 to cause the processor 302 to perform one or more of the operations described herein (e.g., one or more of the operations of method 400, etc.) in connection with the various different parts of the system 100, such that the memory 304 is a physical, tangible, and non-transitory computer readable storage media. Such instructions often improve the efficiencies and/or performance of the processor 302 that is performing one or more of the various operations herein, whereby such performance may transform the computing device 300 into a special-purpose computing device. It should be appreciated that the memory 304 may include a variety of different memories, each implemented in connection with one or more of the functions or processes described herein.

In the example embodiment, the computing device 300 also includes an output device 306 that is coupled to (and is in communication with) the processor 302 (e.g., a presentation unit, etc.). The output device 306 may output information (e.g., schedules, etc.), visually or otherwise, to a user of the computing device 300, such as an operator, a researcher, a grower, etc. It should be further appreciated that various interfaces (e.g., as defined by network-based applications, websites, etc.) may be displayed or otherwise output at computing device 300, and in particular at output device 306, to display, present, etc. certain information to the user. The output device 306 may include, without limitation, a liquid crystal display (LCD), a light-emitting diode (LED) display, an organic LED (OLED) display, an "electronic ink" display, speakers, a printer, etc. In some embodiments, the output device 306 may include multiple devices. Additionally, or alternatively, the output device 306 may include printing capability, enabling the computing device 300 to print text, images, and the like on paper and/or other similar media.

In addition, the computing device 300 includes an input device 308 that receives inputs from the user (i.e., user inputs) such as, for example, seed set requests, inventory data, time/date data, etc. The input device 308 may include a single input device or multiple input devices. The input device 308 is coupled to (and is in communication with) the processor 302 and may include, for example, one or more of a keyboard, a pointing device, a touch sensitive panel, or other suitable user input devices. It should be appreciated that in at least one embodiment the input device 308 may be integrated and/or included with the output device 306 (e.g., a touchscreen display, etc.).

Further, the illustrated computing device 300 also includes a network interface 310 coupled to (and in communication with) the processor 302 and the memory 304. The network interface 310 may include, without limitation, a wired network adapter, a wireless network adapter, a mobile network adapter, or other device capable of communicating to one or more different networks (e.g., one or more of a local area network (LAN), a wide area network (WAN) (e.g., the Internet, etc.), a mobile network, a virtual network, and/or another suitable public and/or private network, etc.), for example, capable of supporting wired and/or wireless communication between the computing device 300 and other computing devices, including with other computing devices used as described herein (e.g., between the computing device 102, the database 104, one or more of the components of the seed processing facility 105, etc.).

FIG. 10 illustrates an example method 400 (or flow) for conveying different seeds into cassettes, consistent with available resources and defined sets. The example method 400 is described herein in connection with the system 100, and may be implemented, in whole or in part, in the scheduler 104 of the system 100. Further, for purposes of illustration, the example method 400 is also described with reference to the computing device 300 of FIG. 9. However, it should be appreciated that the method 400, or other methods described herein, are not limited to the system 100 or the computing device 300. And, conversely, the systems, data structures, and the computing devices described herein are not limited to the example method 400.

At the outset, it should be appreciated that the method 400 is generally consistent with Algorithm 1 provided in Table 1, whereby the value of theta ($\theta$) is defined, and employed as a metric to assess the performance of the different conveyances of the cassettes to be filled. It should be understood that the method 400 may be initialized or started based on a request for a schedule from a user, for example, associated with the system 100, at a time prior to a delivery time or deadline for one or more cassettes, at which the cassettes are to be delivered to the field 122 and other fields for planting. Due to the filling operations being based on the schedule, the request from the user may be received many weeks, or months prior to delivery of and/or final deadline for one or more of the cassettes. For example, the scheduler 104 may receive the request for the schedule at twelve, fifteen, seventeen or twenty weeks prior to filling of a final cassette and/or a deadline to deliver/fill a particular cassette for a particular field. The request may be provided in the form of an email or electronic message to the scheduler 104, or other input to the scheduler 104 (e.g., input via input device 308, etc.), etc. The request may include various inputs including, for example, the number of cassette, deadlines per cassette and/or per field, etc.

The request for a schedule may further be repeated at one or more intervals, regular or irregular, during a filling process for a given number of cassettes and over a fluid inventory of seeds (e.g., as inventories may change up/down as filling progresses, etc.), etc.

Based on the request, as shown in FIG. 10, the scheduler 104 initializes theta, θ, at 402, to a value of zero (and the value of n to zero), and then proceeds to the forward pass segment of the method 400. At 404, the scheduler 104 runs or solves the model (P), using the theta, to determine which seeds are to be populated into which cassettes for a given time period or interval, during a given season. The solution is defined as a schedule for repetitions, or reps, in filling specific cassettes, at specific times.

Next in the method 400, as shown in FIG. 10, the scheduler runs, at 408, a simulation of the filling of the cassettes (e.g., a digital model simulating operation of the seed gantry, counting stations, sorting stations, filling stations, tube filing, tube counting, etc.), based on the solution for the model (P). The simulation of the solution permits the features of the system 100, for example, to be introduced into the method 400, whereby the interactions of tubes, filling timing, cassette movement timing, etc., are considered in evaluating the solution from the model. As such, the simulator is a representation of the system 100, for example, whereby the feasibility of the model output is determined and/or assessed. In one example, only a percentage of the total schedule output from the model may be accomplished in the planned time interval, which is then presented forward in the method 400. That said, in general the simulator attempts to represent the equipment, connections, and their processing capability to help determine feasibility of a plan or schedule and reasonably determine completion time of the plan or schedule under consideration. Based on an expected time period (e.g., one week, one month, etc.) of the plan or schedule, then, the simulation may come short of the time period or may overshoot the time period, providing valuable insight to model P of how to manage the schedule or plan for the next several iterations. These insights are updated in operations 418, 420, and 422.

At 410, the scheduler 104 updates the values for the pre-state, and then increments the value of t by one, at 412, which is representative of the next week or other interval (e.g., day, month, etc.) to be scheduled. The scheduler 104 then determines, at 414, whether the value of the t is greater than or equal to T, which is a threshold number of iterations through the forward pass segment of the method 400 (or a number of days, weeks, months, etc.). If the t is less than T, the scheduler 104 returns to step 404 with the updated values to again run or solve the model (P), whereby the sequences through steps 404-414 are repeated. In this manner, certain reps as output from the model are scheduled and accomplished, according to the scheduler 104, and then remaining reps are pushed into the next week or interval, as defined by t, and the method 400 continues until the model (P) solves for the scheduling of filling all the cassettes and/or the specific time interval (e.g., 5 weeks, 10 weeks, eighteen week, twenty-four weeks, etc.).

When the t is equal to T, the schedule is complete (or the season is ended) and the forward pass stops, and the scheduler 104 proceeds to the backward pass segment of method 400. As shown, in the backward pass segment, the scheduler 104 decrements the value of T (i.e., the number of iterations in the forward pass for the weeks, etc.) by one, at 416, and then proceeds to get value rewards for t+1, at 418 (e.g., line 12 of Algorithm 1 and line 13 of Algorithm 2, etc.), and then determines a reward for t using the value function, Equation (23), at 420. The scheduler 104 then sums the rewards for t and t+1, at 422. The scheduler 104 proceeds, at 424, to the next iteration or interval, by decrementing t, and determining whether t is less than or equal to zero, at 426. When the t is greater than zero, the scheduler 104 proceeds to step 418, and repeats steps 418 through 426 until the t value is less than or equal to zero, whereupon the backward pass stops.

It should be appreciated that the backward sum shown in FIG. 10, then, provides a value of the particular schedule solution, on a week basis in this example, to assess the overall value of the schedule solution (ultimately, relative to other solutions). In other words, the backward pass attempts to capture the true value of the schedule solution, as simulated, from the forward pass.

Next, as shown in FIG. 10, at 428, the scheduler 104 performs a regression analysis of the values from the backward passes and the basis function to determine a value for θ, whereby the reward is provided per rep features per time, and then, this value is updated per time unit.

In this example embodiment, the scheduler 104 increments the iteration value of n, at 430. The scheduler 104 then determines, at 432, whether the value of the iteration (n) is greater than or equal to N, which is a number of iterations through the different segments of the method 400. If the n is less than N, the scheduler 104 updates the values for theta based on the output from the regression analysis, at 434, and then returns to the forward pass segment to repeat the forward and backward segments. When the value of n is equal to N, the method 400 stops, whereby the final values for θ are defined as the last iteration value convergence being achieved with respect to missed deadlines for the reps.

Once solved, the theta and associated values are employed, by the scheduler 104, to generate a solution schedule (or plan) for filling multiple cassettes with seeds, consistent with multiple sets of seeds, for one or more intervals for a specific season. FIG. 11 illustrates an example such solution schedule that may be generated by the scheduler 104, for example, via the method 400. The schedule is then implemented in the system 100, for example, to supply filled seed cassettes in an efficient and rapid manner.

In FIG. 11, the x-axis represents a seed filling schedule of how many cells are to be filled with seeds in each given week. The y-axis represents when the seeds arrive into the seed processing facility that were filled into the cells of cassettes. And, the shading shows the gradient of count of cells that are to be filled in a week. In this example, the schedule (or plan) is for a 17 week season, for example, and the seeds that need to be filled in the cassettes may arrive at any time from week 1 to week 17. This arrival of the seeds is not deterministic, such that the seeds may arrive at the seed processing facility at different times. As shown in this example, much of the seeds begin to arrive after week 5. Some seeds that arrive early are used for filling in later weeks, while some is used for filling instantly. Based on the design of maps, different cassettes have a demand of different varieties of seeds in different proportions that in turn demand resources at a variable scale. The objective of the method 400 (and scheduler 104), then, is to reduce the missed deadlines for cassettes to be filled at the same time, given the uncertainty in arrival of seeds. In other words, in various examples, the method 400 (and scheduler 104) operates to balance supply and demand to reduce the overall completion time of the seed processing facility. Thus, as can be seen, the method 400 (and scheduler 104) may learn through tens of thousands of alternative seasons and through constantly revising the learning parameters the value of different seed varieties in different weeks. Based on these learnings, the method 400 (and scheduler 104) suggests plans that will help facility completing the production in fewer weeks while missing fewer deadlines.

With that said, it should be appreciated that the functions described herein, in some embodiments, may be described in computer executable instructions stored on a computer readable media, and executable by one or more processors. The computer readable media is a non-transitory computer readable media. By way of example, and not limitation, such computer readable media can include RAM, ROM, EEPROM, CD-ROM or other optical disk storage, magnetic disk storage or other magnetic storage device, or any other medium that can be used to carry or store desired program code in the form of instructions or data structures and that can be accessed by a computer. Combinations of the above should also be included within the scope of computer-readable media.

It should also be appreciated that one or more aspects of the present disclosure may transform a general-purpose computing device into a special-purpose computing device when configured to perform one or more of the functions, methods, and/or processes described herein.

As will be appreciated based on the foregoing specification, the above-described embodiments of the disclosure may be implemented using computer programming or engineering techniques, including computer software, firmware, hardware or any combination or subset thereof, wherein the technical effect may be achieved by performing at least one of the following operations: (a) in response to a request for a schedule, accessing data associated with a plurality of cassettes, the data including a seed set specific to each of the cassettes, at least a portion of the seed set including multiple different seeds; (b) generating a schedule to fill the plurality of cassettes with seeds, consistent with the seed sets specific to the plurality of cassettes, via a gantry, multiple counting stations, and a filling station, based on a throughput of the gantry, the multiple counting stations, and the filling station; (c) storing the schedule in memory; (d) executing the schedule, at the gantry, the multiple counting stations, and the filling station to fill at least a portion of the plurality of cassettes consistent with the schedule; (e) filling the plurality of cassettes; (f) directing the plurality of cassettes filled with seeds to one or more fields, whereby the seeds included in the plurality of cassettes are planted in the one or more fields; and/or (g) operating one or more planters to plant the seeds included in the plurality of cassettes in the one or more fields.

Examples and embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail. In addition, advantages and improvements that may be achieved with one or more example embodiments disclosed herein may provide all or none of the above-mentioned advantages and improvements and still fall within the scope of the present disclosure.

Specific values disclosed herein are example in nature and do not limit the scope of the present disclosure. The disclosure herein of particular values and particular ranges of values for given parameters are not exclusive of other values and ranges of values that may be useful in one or more of the examples disclosed herein. Moreover, it is envisioned that any two particular values for a specific parameter stated herein may define the endpoints of a range of values that may also be suitable for the given parameter (i.e., the disclosure of a first value and a second value for a given parameter can be interpreted as disclosing that any value between the first and second values could also be employed for the given parameter). For example, if Parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, and 3-9.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "in communication with," or "included with" another element or layer, it may be directly on, engaged, connected or coupled to, or associated or in communication or included with the other feature, or intervening features may be present. As used herein, the term "and/or" and the phrase "at least one of" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for use in filling cassettes consistent with sets of seeds, the method comprising:

in response to a request for a schedule, accessing, by a scheduler computing device, data associated with a plurality of cassettes, the data including a seed set specific to each of the cassettes, at least a portion of the seed set including multiple different seeds;

generating, by the scheduler computing device, the schedule to fill the plurality of cassettes with seeds, consistent with the seed sets specific to the plurality of cassettes, via a gantry, multiple counting stations, and a filling station, based on a throughput of each of the gantry, the multiple counting stations, and the filling station;

storing, by the scheduler computing device, the schedule in memory; and executing, by the scheduler computing device, the schedule, at the gantry, the multiple counting stations, and the filling station to fill at least a portion of the plurality of cassettes consistent with the schedule.

2. The computer-implemented method of claim 1, wherein the plurality of cassettes includes more than one hundred cassettes; and wherein the seed sets specific to the plurality of cassettes include more than one thousand different seeds.

3. The computer-implemented method of claim 1, wherein generating the schedule includes generating the schedule based on the following objective (P):

$$(P)\hat{V}_t(s_t) = \min \sum_{r \in \hat{R}_t} u_r \delta_{rt} + \sum_{m=1}^{M} \theta_{mt}(\mu_{mt} - \sum_{r=1}^{R} z_{mr} x_{rt}),$$

wherein V represents delay associated with rep r, whose deadline is time period t or earlier; $s_t$ is a state at time t; R is a total number of reps r; $u_r$ is a binary variable indicating whether the deadline of rep r is missed if the rep r is not produced in time period t; $\delta_{rt}$ is marginal cost of delaying rep r one more time period; M is a vector representing the reps r; $\theta_{mt}$ is a real-valued weight or coefficient; $\mu_{mt}$ is a number of reps r of relative maturity (RM) m; $z_{mr}$ is 1 if rep r belongs to RM, m, and 0 otherwise; and $x_{rt}$ is a binary variable indicating whether a plan exists to complete rep r in the time period, t, or not.

4. The computer-implemented of claim 3, wherein generating the schedule is further based on:

$$C(s_t, x_t) = \sum_{r \in \hat{R}_t} (1 - x_{rt}),$$

wherein C is the minimum number of tubes of any inventory that can be filled in the time period t; and $x_t$ is a decision at time period t.

5. The computer-implemented method of claim 1, wherein generating the schedule includes:

initializing, by the scheduler computing device, a value for a theta metric to assess performance of different conveyances of the plurality of cassettes to be filled;

in response to initializing the value for the theta metric:

(a) executing, by the scheduler computing device, an objective function based on the value of the theta metric;

(b) simulating, by the scheduler computing device, filling of the plurality of cassettes, based on a solution for the executed objective function; and (c) incrementing, by the scheduler computing device, a time period t;

updating, by the scheduler computing device, the value of the theta metric and repeating steps (a) through (c); and when the time period t satisfies a threshold condition T:

(i) decrementing, by the scheduler computing device, a value of the threshold condition T;

(ii) determining, by the scheduler computing device, one or more rewards for a time period t+1;

(iii) determining, by the scheduler computing device, one or more rewards for the time period t;

(iv) summing, by the scheduler computing device, the one or more rewards for the time period t and the one or more rewards for the time period t+1; and repeating, by the scheduler computing device, steps (i) through (iv);

performing, by the scheduler computing device, a regression analysis of the values from iterations of steps (i) through (iv) and a basis function to determine the value for the theta metric; and defining, by the scheduler computing device, the schedule based on the determined value for the theta metric.

6. The computer-implemented method of claim 1, further comprising filling the plurality of cassettes.

7. The computer-implemented method of claim 6, wherein filling the plurality of cassettes includes:

moving, via the gantry, multiple jars of seeds, form multiple containers, to the counting stations consistent with the generated schedule; and/or advancing seeds from the counting stations to the filling station, via a sorting station.

8. The computer-implemented method of claim 7, further comprising directing the plurality of cassettes filled with seeds to one or more fields, whereby the seeds included in the plurality of cassettes are planted in the one or more fields.

9. The computer-implemented method of claim 8, further comprising operating one or more planters to plant the seeds included in the plurality of cassettes in the one or more fields.

10. A non-transitory computer-readable storage medium including executable instructions, which when executed by at least one processor of a scheduler computing device in connection with filling cassettes consistent with sets of seeds, cause the at least one processor to:

in response to a request for a schedule, access data associated with a plurality of cassettes, the data including a seed set specific to each of the cassettes, at least a portion of the seed set including multiple different seeds;

generate the schedule to fill the plurality of cassettes with seeds, consistent with the seed sets specific to the plurality of cassettes, via a gantry, multiple counting stations, and a filling station, based on a throughput of each of the gantry, the multiple counting stations, and the filling station;

store the schedule in memory; and execute the schedule, at the gantry, the multiple counting stations, and the filling station to fill at least a portion of the plurality of cassettes consistent with the schedule.

11. The non-transitory computer-readable storage medium of claim 10, wherein the executable instructions, when executed by the at least one processor, cause the at least one processor to generate the schedule based on:

$$(P)\tilde{V}_t(s_t) = \min \sum_{r \in \hat{\mathcal{R}}_t} u_r \delta_{rt} + \sum_{m=1}^{M} \theta_{mt}\left(\mu_{mt} - \sum_{r=1}^{R} z_{mr} x_{rt}\right); \text{ and}$$

$$C(s_t, x_t) = \sum_{r \in \hat{\mathcal{R}}_t} (1 - x_{rt});$$

wherein V represents delay associated with rep r, whose deadline is time period t or earlier; $s_t$ is a state at time t; R is a total number of reps r; $u_r$ is a binary variable indicating whether the deadline of rep r is missed if the rep r is not produced in time period t; $\delta_{rt}$ is marginal cost of delaying rep r one more time period; M is a vector representing the reps r; $\theta_{mt}$ is a real-valued weight or coefficient; $\mu_{mt}$ is a number of reps r of relative maturity (RM) m; $z_{mr}$ is 1 if rep r belongs to RM, m, and 0 otherwise; $x_{rt}$ is a binary variable indicating whether a plan exists to complete rep r in the time period, t, or not; and C is the minimum number of tubes of any inventory that can be filled in the time period t.

12. The non-transitory computer-readable storage medium of claim 10, wherein the executable instructions, when executed by the at least one processor to generate the schedule, cause the at least one processor to:

initialize a value for a theta metric to assess performance of different conveyances of the plurality of cassettes to be filled;

in response to initializing the value for the theta metric:

(a) execute an objective function based on the value of the theta metric;

(b) simulate filling of the plurality of cassettes, based on a solution for the executed objective function; and (c) increment a time period t;

update the value of the theta metric and repeat steps (a) through (c); and when the time period t satisfies a threshold condition T:

(i) decrement a value of the threshold condition T;

(ii) determine one or more rewards for a time period t+1;

(iii) determine one or more rewards for the time period t;

(iv) sum the one or more rewards for the time period t and the one or more rewards for the time period t+1; and repeat steps (i) through (iv);

perform a regression analysis of the values from iterations of steps (i) through (iv) and a basis function to determine the value for the theta metric; and define the schedule based on the determined value for the theta metric.

13. The non-transitory computer-readable storage medium of claim 10, wherein the executable instructions, when executed by the at least one processor, cause the at least one processor to:

move, via the gantry, multiple jars of seeds, form multiple containers, to the counting stations consistent with the generated schedule;

advance seeds from the counting stations to the filling station, via a sorting station;

direct the filling station to fill the cassettes with the advanced seeds; and direct the plurality of cassettes filled with seeds to one or more fields, whereby the seeds included in the plurality of cassettes are planted in the one or more fields.

14. A system for use in processing seeds, the system comprising:

a gantry configured to retrieve specific seeds for processing from a seed supply;

at least one counting station configured to receive the seeds from the gantry and deliver a desired number of the seeds into one or more containers;

a filling station configured to transfer the seeds from the one or more containers to one or more cassettes; and a scheduler computing device configured to generate a schedule to fill the one or more cassettes with the seeds based, at least in part, on (i) a throughput of each of the gantry, the at least one counting station, and the filling station and on (ii) the seed supply.

15. The system of claim 14, wherein the schedule includes a seed set to be included in each of the one or more cassettes, at least a portion of the seed set for each of the one or more cassettes including multiple different seeds.

16. The system of claim 15, further comprising at least one memory in communication with the scheduler computing device; and wherein the scheduler computing device is further configured to store the generated schedule in the memory.

17. The system of claim 14, wherein the gantry is configured to retrieve the specific seeds for processing from the seed supply based on the generated schedule;

wherein the at least one counting station is configured to receive the seeds from the gantry and deliver the desired number of the seeds into the one or more containers based on the generated schedule; and wherein the filling station is configured to transfer the seeds from the one or more containers to one or more cassettes based on the generated schedule.

18. The system of claim 14, wherein the gantry is a first gantry, and wherein the system further includes a second gantry configured to retrieve the one or more cassettes from the filling station, wherein the first gantry is separate from the second gantry.

19. The system of claim 14, further comprising the seed supply;

wherein the seed supply includes multiple containers of seeds, and wherein the gantry is configured, in order to retrieve the specific seeds for processing, to retrieve specific ones of the containers holding the specific seeds.

20. The system of claim 19, further comprising a container handling unit configured to deliver the containers retrieved by the gantry to the at least one counting station.

* * * * *